US 8,060,418 B2

(12) United States Patent
Honts et al.

(10) Patent No.: US 8,060,418 B2
(45) Date of Patent: Nov. 15, 2011

(54) DIGITAL FOOTPRINT DRIVEN MULTI-CHANNEL INTEGRATED SUPPORT SYSTEM

(75) Inventors: Robert W. Honts, Austin, TX (US); Robert E. Wollan, St. Paul, MN (US); Allen J. Delattre, Wilton, CT (US); Daniel G. Andrews, Irving, TX (US); John J. Murray, II, Alpharetta, GA (US); Stephanie D. Sadowski, Charlotte, NC (US); Charles J. Forsythe, Florham Park, NJ (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 12/397,214

(22) Filed: Mar. 3, 2009

(65) Prior Publication Data
US 2009/0228379 A1 Sep. 10, 2009

Related U.S. Application Data

(60) Provisional application No. 61/033,375, filed on Mar. 3, 2008.

(51) Int. Cl.
*G07B 17/00* (2006.01)

(52) U.S. Cl. .......... 705/30; 709/200; 709/201; 709/202; 709/219; 709/221; 709/223; 709/225; 709/227; 705/14; 705/35; 705/51; 705/56; 719/310; 719/315; 719/320; 717/106; 717/121; 717/143; 717/176

(58) Field of Classification Search .............. 705/30
See application file for complete search history.

(56) References Cited

U.S. PATENT DOCUMENTS
4,949,278 A 8/1990 Davies et al.
(Continued)

FOREIGN PATENT DOCUMENTS
EP 1 197 902 A2 4/2002
WO WO 00/02389 1/2000
(Continued)

OTHER PUBLICATIONS

Strom, David. What Innovation Is All About. VARbusiness, p. 4, Jan. 26, 2004.*

(Continued)

*Primary Examiner* — F. Zeender
*Assistant Examiner* — Fawaad Haider
(74) *Attorney, Agent, or Firm* — Brinks Hofer Gilson & Lione

(57) ABSTRACT

A digital footprint driven multi-channel integrated support system assists a user in managing electronic components based on his or her digital footprint. The digital footprint driven multi-channel integrated support system delivers a dramatically improved 'digital home support' experience across multiple support channels (e.g., 'on-the-box', web, IVR, agent voice, agent chat, agent email, and more). The digital footprint driven multi-channel integrated support system generates, displays, and uses a 'digital footprint' of the components within the home, such as computer hardware/software, computer peripherals, audio/visual equipment, gaming hardware/software, home security hardware/software, or other electronic components.

36 Claims, 36 Drawing Sheets

U.S. PATENT DOCUMENTS

| | | | |
|---|---|---|---|
| 5,175,800 A | 12/1992 | Galis et al. | |
| 5,963,939 A | 10/1999 | McCann et al. | |
| 6,745,172 B1 | 6/2004 | Mancisidor et al. | |
| 6,993,508 B1 * | 1/2006 | Major et al. | 705/51 |
| 2002/0017557 A1 * | 2/2002 | Hendrick | 235/380 |
| 2002/0173313 A1 * | 11/2002 | Hutcheson et al. | 455/453 |
| 2003/0037173 A1 * | 2/2003 | Pace et al. | 709/310 |
| 2003/0120817 A1 | 6/2003 | Ott et al. | |
| 2006/0038672 A1 * | 2/2006 | Schoettle | 340/522 |
| 2008/0183852 A1 | 7/2008 | Pramer et al. | |

OTHER PUBLICATIONS

Ayala R. et al.: "Internet technology based infrastructure for mobile multimedia services" 19990921; 19990921-19990924, Sep. 21, 1999, pp. 109-113, XP010353805 p. 109, col. 1, paragraphs 1, 2—col. 2, paragraph 2; p. 110, col. 1, paragraphs 1, 4—p. 112, col. 2, paragraphs 2, 3.

European Search Report mailed Aug. 21, 2008, for corresponding European Application No. 07009408.1.

* cited by examiner

North America Segments & Experiences
Scenario 1: Householders

Bill is able to buy based on most popular ("Wisdom of the Crowd") and College-ready machines.

*Make it easy to buy and organize my digital footprint*

Buy › Connect › Use › Solve

ConvergInc - Notebook Recommendations | Search

Here are the most popular models and configurations for incoming freshman:

PowerLite 1420: 14.1" HD Widescreen
2M L2 Cache, 800MHz Dual Core
512MB, DDR2-667 SDRAM
Popularity (8/10)

PowerLite 1520: 15.4" HD Widescreen
2M L2 Cache, 800MHz Dual Core
512MB, DDR2-667 SDRAM
Popularity (7.5/10)

PowerLite Elite 133M: 13.3"HD Widescreen
2M L2 Cache, 800MHz Dual Core
512MB, DDR2-667 SDRAM
Popularity (7.1/10)

Upgrade Options:
☑ Free Screensaver
☑ Student Connectivity Pack
☑ 3G Wireless Connectivity Subscription Continue Bill Watson Back  Next

North America Segments & Experiences
Home CIOs

[Buy] [Connect] [Use] [Solve]   *Make it easy for me to add, connect and use*

Jane reviews the results of the PC Health Check and sees that her broadband connectivity is both intermittent and slow.

Health Check — 2000

Health Check

System Status
- HARDWARE
- CPU Utilization
- Memory Size: 4GB DMM
- Memory in Use: 67GB
- HDD Storage: 80.5 G
- Available: 64GB
- Used: 12.6GB
- Video Memory: 8GB
- Network Devices: (4)
- Show All
- SYSTEM
- OS Windows Vista Ultimate
- Computer Name: Jane's PC

Network Status — 2004
- NETWORK CONNECTION
- Active Networks connected to SMC and has the IP address
- 99.141.194.176
- Create Network
- Join Network
- Network Throughput
- BPS
- POWER
- Source: AC
- Battery Charge:
- B1  B2
- 23%  14%

Security Status — 2006
- SECURITY
- Spyware Active
- Updated 11/23/07
- Antivirus Active
- Updated 11/23/07
- Firewall: Active
- Updated 11/23/07
- Security Level: (High)
- Privacy Level: (Medium)
- Threat Count: (0)
- ▶ View Thread Details   [Repair]

Maintenance — 2008
- ACTIONS REQUIRED
- Last Backup 11/24/2007
- (6 Days ago) View Details
- Disk Defragmentation
- Mailbox Cleanup
- Clear Unapproved Cookies
- Dump Temp File
- Onboard Test   [Repair]
- SUPPORT
- ▶ Remote Access  ON OFF
- ▶ Connect  ON OFF
- ▶ Update Settings

[ConvergInc Support]
[Contact ConvergInc]
[Repair All]

Results: — 2010
- ⚠ Network connectivity has dropped 8 times in the past 48 hrs.
- ⚠ Network throughput is below Broadband thresholds.

Jane Harrison — 2002

Back ▽    △ Next

FIG. 20

DIGITAL FOOTPRINT DRIVEN MULTI-CHANNEL INTEGRATED SUPPORT SYSTEM

RELATED APPLICATIONS

This application claims the benefit of priority under 35 U.S.C. §119(e) to U.S. Pat. App. No. 61/033,375, filed Mar. 3, 2008, which is hereby incorporated by reference in its entirety.

BACKGROUND

1. Technical Field

This application relates to integration and support of electronic devices. In particular, this application relates to a multi-channel integrated support system that provides support to a consumer based on his or her digital footprint of electronic components.

2. Related Art

Most consumers have multiple electronic components in their home, office, car, and virtually every other location that they frequent. For example, at home, a consumer may have a personal computer, DVD player, CD player, Blu-Ray player, a high-definition television, a digital video recorder, and other components. The consumer may even own more than one of the same type of component. A consumer often goes through great lengths in setting up their devices and interconnecting them. For a consumer comfortable and familiar with electronic components, setting up electronic equipment may be an enjoyable process that takes a reasonable amount of time.

However, for the layman that is not familiar with electronics, setting up one electronic component can be a daunting task. Moreover, a layman having to set up more than one electronic component and interconnect them in a configuration in which they cooperate and communicate may take hours or even days. After spending a great deal of time working with the electronic components and interconnecting them, there is a strong disincentive for the layman to ever change the configuration.

However, replacing an electronic component in a system is inevitable. Electronic components are prone to failure, either in hardware or software. Additionally, electronic components quickly become outdated and replaced by components implementing improved visual or audio standards. In other situations, a consumer may want to replace an electronic component simply to upgrade to a newer model of the same type of electronic component, or replace one type of electronic component with a second type of electronic component (e.g., replace a HD-DVD player with a Blu-Ray player).

Replacing or upgrading the older electronic component may be daunting task in and of itself. There are many factors for a consumer to consider when purchasing a new electronic component to replace the older electronic component. Such factors include whether the new electronic component is compatible with the existing system, whether the new electronic component supports the other pre-existing electronic components, whether the person will need additional cables to connect the new electronic component with the existing system, and many other factors. The consumer that spent many hours setting up their existing system has little to no desire to determine whether the new electronic component will be compatible with the existing system. Moreover, with all the aforementioned considerations, it is quite difficult for a consumer to keep track of all the different types of scenarios that could arise with purchasing the new electronic component.

Furthermore, with any purchase of an electronic component, there is no guarantee that the component will initially function or continue to function satisfactorily. And while the technology savvy consumer may be able to readily coax the component into satisfactory performance, the layman may be completely unable to find a workable solution. In an increasingly complex and technology dependent world, inadequately performing electronic components pass beyond merely annoying to serious roadblocks to day-to-day existence.

At the same time, there are many technical problems associated with addressing the problems noted above. Examples of the technical problems include how to determine the compatibility of the newer electronic component with the existing electronic components, tracking the addition, removal, and modification of the electronic components in the existing system, presenting compatibility information in a meaningful and understandable manner, avoiding data loss, detecting when components are not performing adequately, providing meaningful help to assist the consumer with correcting component performance problems, and storing information that captures the electronic components in the consumer's environment.

Hence, there is a need to address the problems noted above and others previously experienced.

SUMMARY

A digital footprint driven multi-channel integrated support system assists a user in managing one or more electronic components based on his or her digital footprint. The digital footprint driven multi-channel integrated support system delivers a dramatically improved 'digital home support' experience across multiple support channels (e.g., 'on-the-box', web, IVR, agent voice, agent chat, agent email, and more).

The digital footprint driven multi-channel integrated support system generates, displays, and utilizes a 'digital footprint' of the components within the home, such as computer hardware/software, computer peripherals, audio/visual equipment, gaming hardware/software, home security hardware/software, or other electronic components.

The digital footprint driven multi-channel integrated support system is configured to provide highly-tailored experiences across different customer segments, based on customer behaviors and/or aptitude, and monitors a user's 'digital footprint' information in the provisioning of 'digital home support' service through various support channels. For example, the digital footprint driven multi-channel integrated support system may initiate the display of a household view through a combination of network auto-detection, customer records, purchase records, or other customer support systems.

The digital footprint driven multi-channel integrated support system enhances technical support by combining existing on-the-box tools with local and remote software that aids in the troubleshooting of interconnected devices in the digital home. For example, the digital footprint driven multi-channel integrated support system may be configured to auto-detect error conditions and guide a user through resolution options based on the user's customer segment.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 7 shows one example of a notebook recommendation graphical user interface.

FIG. 11 shows one example of an educational graphical user interface that displays educational information about an electronic component.

FIG. 20 shows one example of a system health graphical user interface that displays system-health related information to a user.

DETAILED DESCRIPTION

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the digital footprint driven multi-channel integrated support system and method may be stored on, distributed across, or read from other machine-readable media. The digital footprint driven multi-channel integrated support system may be implemented in secondary storage devices such as hard disks, floppy disks, and CD-ROMs; as part of a signal received from a network; or in other forms of ROM or RAM. The digital footprint driven multi-channel integrated support system may be implemented in any type of software or hardware, either currently known or later developed.

Furthermore, although specific components of the digital footprint driven multi-channel integrated support system will be described, methods, systems, and articles of manufacture consistent with the digital footprint driven multi-channel integrated support system may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors.

Figure 1:
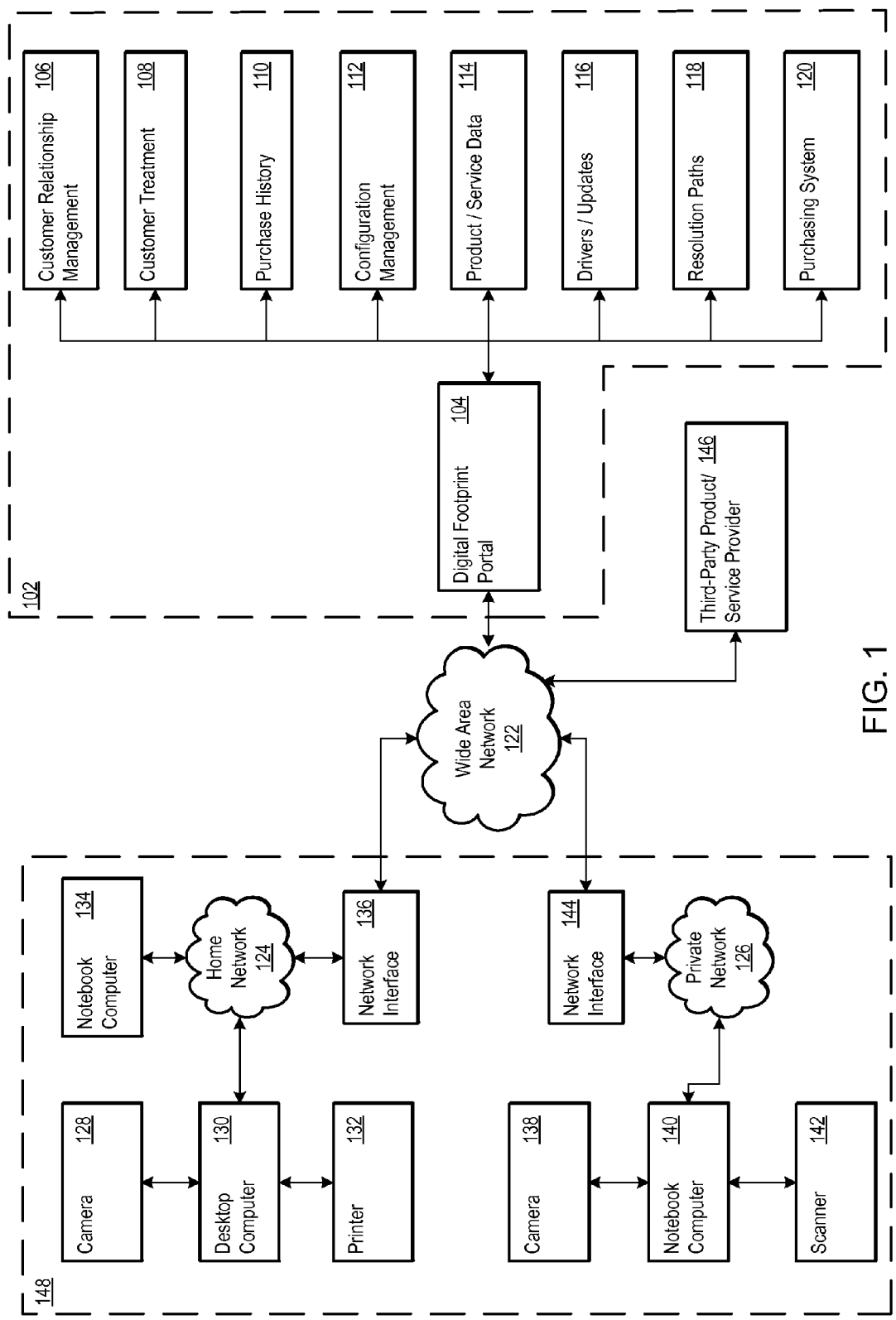
FIG. 1 shows one example of a digital footprint driven multi-channel integrated support system in communication with a household electronic component system.

FIG. 1 shows one example of a digital footprint driven multi-channel integrated support system 102 in communication with a household electronic component system 148. In one implementation, the digital footprint driven multi-channel integrated support system 102 resides or is managed by a primary provider of electronic components. Hence, the digital footprint driven multi-channel integrated support system 102 may be configured with the electronic components or services offered for sale or use by the primary provider. In purchasing the electronic component or service from the primary provider, the user may communicate with the digital footprint driven multi-channel integrated support system 102.

In one implementation, the digital footprint driven multi-channel integrated support system 102 includes a digital footprint portal 104. The digital footprint portal 104 may monitor and maintain a user's digital footprint. For example, the digital footprint portal 104 may maintain a master digital footprint that represents the user's configured electronic components. The digital footprint portal 104 may also have logic or other software and/or hardware to store and manage the user's digital footprint.

As shown in FIG. 1, the digital footprint portal 104 is in communication with one or more customer support systems 106-120. The customer support systems 106-120 may include a customer relationship management system 106, a customer treatment system 108, a purchase history system 110, a configuration management system 112, a product/service data system 114, a drivers/updates system 116, a resolution paths system 118, and a purchasing system 120. In alternative arrangements, the digital footprint portal 104 may be in communication with additional or fewer customer support systems. In one implementation, the digital footprint portal 104 is a custom rich internet application ("RIA").

Each of the customer support systems 106-120 may be operative to provide information to the digital footprint portal 104 to further develop or enhance the user's digital footprint. The customer support systems 106-120 may also be operative to enhance the user's experience when managing the user's digital footprint or electronic components represented by the user's digital footprint.

The customer support systems 106-120 may be configured for various roles. The customer relationship management system 106 may be operative to manage user profiles, household profiles, contact histories, user technical support cases, or other information relating to the user. The customer relationship management system 106 may be configured for additional or alternative roles as well. In one implementation, the customer relationship management system 106 is Siebel Customer Relationship Management available from Oracle Corporation located in Redwood Shores, Calif.

The customer treatment system 108 may be operative to enhance the user's experience when managing or manipulating the user's digital footprint. The customer treatment system 108 may also be configured to control what experience, rights, offers, and opportunities to which the user is entitled. In one implementation, the customer treatment system 108 is implemented as described in U.S. patent application Ser. No. 10/811,439, which is incorporated by reference in its entirety herein, as described in U.S. patent application Ser. No. 10/810,910, which is incorporated by reference in its entirety herein, or as described in U.S. patent application Ser. No. 10/811,367, which is incorporated by reference in its entirety herein.

The purchase history system 110 may be operative to monitor and store the user's purchase history of electronic components. The purchase history system 110 may also monitor the user's purchase of electronic components from third-party providers or other providers. In one implementation, the purchase history system 110 is Siebel Customer Relationship Management.

The configuration management system 112 may be operative to manage or provide details and information relating to one or more electronic components. Examples of the type of information and details managed by the configuration management system 112 may include an electronic component's technical specifications, compatible and incompatible electronic components, the nominal operating parameters for the electronic component, or other technical information. The configuration management system 112 may also maintain possible scan operations or diagnostic operations for diagnosing errors or deviations from nominal operating parameters of the user's electronic component. The configuration management system 1120 may further maintain troubleshooting information for assisting the user in troubleshooting or determining errors with the electronic component. In one implementation, the configuration management system 112 is a database from Oracle Corp.

The product/service data system 114 may be operative to manage or provide details or information relating to an offered electronic component or service. For example, the product/service data system 114 may manage or provide warranty information for an electronic component or service, or the product/service data system 114 may manage pricing and servicing information for the offered electronic component or service. Alternative or additional information about the offered electronic component or service is also possible. In one implementation, the product/service data system 114 is Siebel Customer Relationship Management.

The drivers/updates system 116 may be operative to manage or provide information relating to software drivers and/or software updates for an electronic component. The drivers/updates system 116 may also manage or provide information relating to additional or replacement parts for the electronic component. Additional or alternative information relating to the electronic component is also possible. In one implementation, the drivers/updates system 116 is a database from Oracle Corp.

The resolution paths system 118 is operative to manage or provide information relating to diagnosing or troubleshooting errors with the electronic component. The resolution paths system 118 may also manage or provide educational information for the electronic component or service, such as instructions detailing how to set up or use the electronic component, or alternative or additional functions provided by the electronic component. In one implementation, the resolution paths system 118 is a custom rich internet application ("RIA").

The purchasing system 120 is operative to manage and provide information relating offers to purchase electronic components or services from the primary provider. For example, the digital footprint portal 104 may communicate with the purchasing system 120 is initiate the display of the primary provider's offered electronic components or services. In one implementation, the purchasing system 120 is Siebel Customer Relationship Management in conjunction with a database from Oracle Corp.

The digital footprint driven multi-channel integrated support system 102 is in communication with the household electronic component system 148 via a wide area network 106, such as the Internet. In other implementations, the digital footprint driven multi-channel integrated support system 102 communicates with the household electronic component system 148 via a local area network. The digital footprint driven multi-channel integrated support system 102 may use any number or combination of wired or wireless technologies to communicate with the household electronic component system 148. In addition, the digital footprint driven multi-channel integrated support system 102 may be the household electronic component system 148.

The household electronic component system 148 of FIG. 1 includes two networks 124-126 of interconnected electronic components 128-144. The two networks 124-126 include a home network 124 and a private network 126. The home network 124 and the private network 126 communicate with the digital footprint portal 104 using network interfaces 136, 144. The network interfaces 136,144 may be a cable modem, a DSL modem, a dial-up modem, or any other now known or later developed modem. The network interfaces 136, 144 may also be any type of wired or wireless network interface, such as Ethernet, fiber optic, or any other now known or later developed network interface.

In one implementation, the home network 124 includes interconnected electronic components 128-136. The electronic components 128-136 may include a digital camera 128, a desktop computer 130, a printer 132, a notebook computer 134, and the network interface 136. The interconnected electronic components 128-136 may be connected to each other directly or indirectly. For example, the desktop computer 130 is directly connected to the digital camera 128, and the notebook computer 134 is indirectly connected to the digital camera 128. In other words, each of the electronic components 128-136 may be in communication with each other.

Like the home network 124, the private network 126 includes interconnected electronic components 138-144. The electronic components 138-144 may include a digital camera 138, a notebook computer 140, a scanner 142, and the network interface 144. The interconnected electronic components 138-144 may be connected to each other directly or indirectly. For example, the notebook computer 140 is directly connected to the scanner 142 and the scanner is indirectly connected to the digital camera 138. In other words, each of the electronic components 128-136 may be in communication with each other.

The digital footprint portal 104 is configured to store and manage a master digital footprint that represents the electronic components 128-144 of the household electronic component system 148. The master digital footprint may include a listing of each of the electronic components 128-144. The master digital footprint may also include a listing of the connections between each of the electronic components 128-144. The digital footprint portal 104 may be further configured to provide information and data from the customer support systems 106-120 based on the master digital footprint of the electronic components 128-144.

In one implementation, the system 102 employs device discovery, electronics environment information management, device installation feedback, or other techniques that U.S. patent application Ser. No. 11/699,211, titled "VIRTUAL INFORMATION TECHNOLOGY ASSISTANT" describes in connection with a Virtual IT Assistant. For example, the digital footprint portal 104 may employ the Virtual IT Assistant techniques for discovering devices in connection with generating all or part of a digital footprint. In another implementation, the digital footprint portal 104 communicates with the Virtual IT Assistant to retrieve all or part of the electronics environment discovered or managed by the Virtual IT Assistant. The system 102 (e.g., the portal 104) may then adapt the electronics component system by adding, removing, or updating electronic components (e.g., to take into consideration purchase receipts, warranty information, or other data as noted above) to reach the digital footprint. The digital footprint portal 104 may also employ additional or alternative component discovery, electronics environment building, and electronics environment information management techniques than those described in U.S. patent application Ser. No. 11/699,211.

In addition to the household electronic component system 148 and the digital footprint driven multi-channel integrated support system 102, a third-party product/service provider 146 may be in communication with the household electronic component system 148 and the digital footprint driven multi-channel integrated support system 102. The third-party product/service provider 146 may offer electronic components, services, or other products to the user associated with the household electronic component system 148. The digital footprint portal 104 may have access to the details or information about the electronic components and services offered by the third-party product/service provider 146 such that when the user purchases an electronic component or service from the third-party product/service provider 146, the digital footprint portal 104 is alerted of the purchase. After being alerted of the purchase, the digital footprint portal 104 may offer technical support services to the user and may update the user's digital footprint to incorporate the purchased electronic component or service. In addition, the user may contact the digital footprint portal 104 to obtain technical support information or other information relating to the electronic component or service purchased from the third-party product/service provider 146. Hence, in this fashion, a user may still obtain technical support from a primary provider even where the user purchases an electronic component or service from a third-party.

Figure 2:
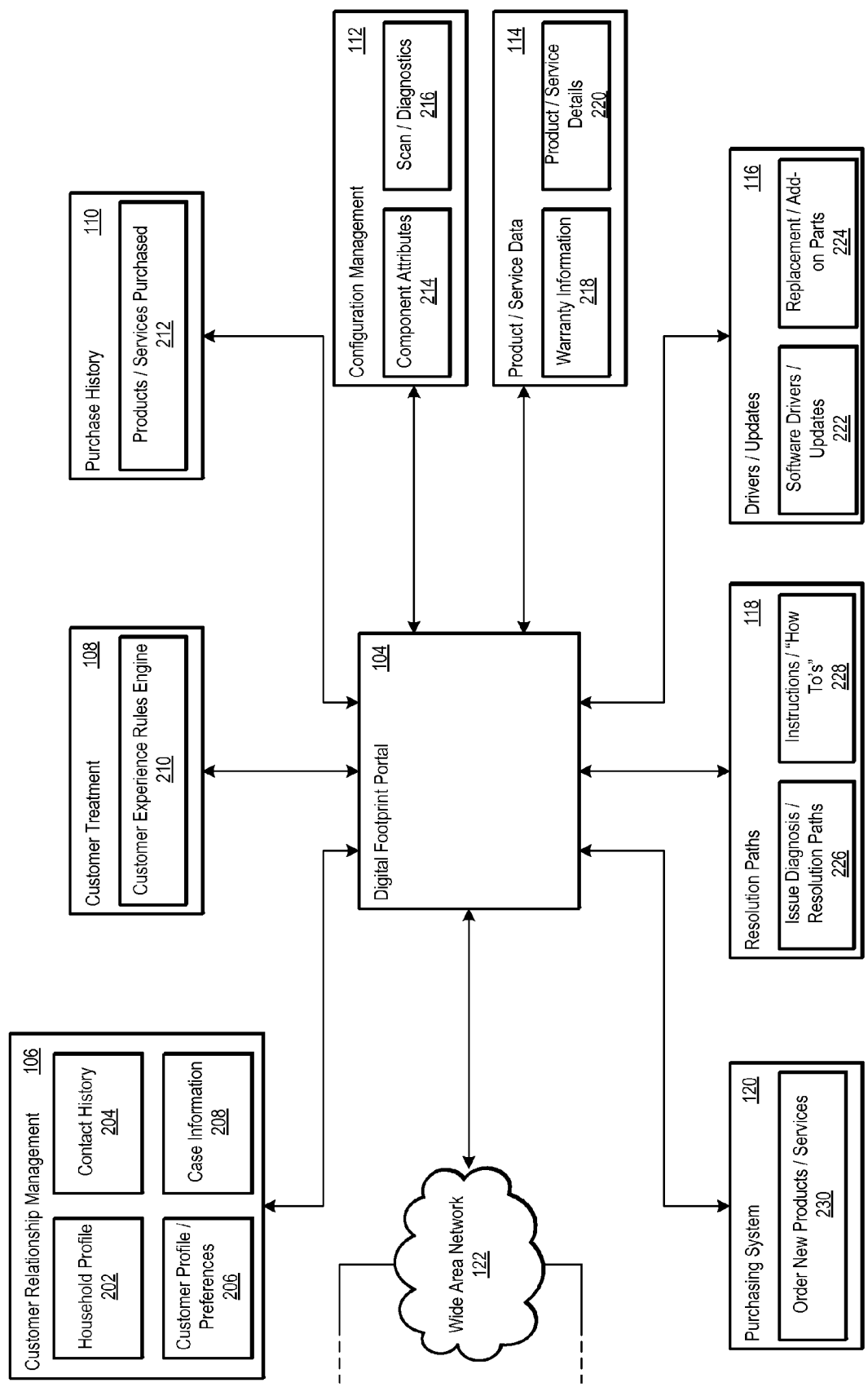
FIG. 2 shows one example of an implementation of the digital footprint driven multi-channel integrated support system of FIG. 1.

FIG. 2 shows one example of an implementation of the customer support systems 106-120 of the digital footprint driven multi-channel integrated support system of FIG. 1. In one implementation, the customer relationship management system 106 maintains databases 202-208 for managing user profiles, household profiles, contact histories, user technical support cases, or other information relating to the user. For example, the customer relationship management system 106 may have a household profile database 202, a contact history database 204, a customer profile/preferences database 206, and a user technical support case database 208. The household profile database 202 may store information relating to a household. In general, a user is a member of a household, and a user may be associated with one or more electronic components. Hence, a household profile may represent a profile for related users and their associated electronic components for the household. Users may be related as family, as business associates, as educational colleagues, or through some other relationship. A household profile may have one user or may have any number of users.

The contact history database 204 may store contact history information for a household or for particular users. The contact history information may include current or past residential or business addresses, current or past residential or business phone numbers, or other contact history information. The contact history information may also include electronic contact history information, such as e-mail addresses, websites, or other electronic contact history information.

The customer profile/preferences database 206 may store information relating to the individual preferences of a user. Hence, the customer profile/preferences database 206 may store such information as a user's name, age, birth date, ethnicity, place of employment, technical skill level, earning potential, or any other information about the user.

The user technical support case database 208 may store information relating to a technical support issue for a user, a household, or both. The technical support case database 208 may include such information as the type of technical issues encountered by the user or household, the frequency of the technical issues, the electronic components involved in the technical issues, the customer support technicians involved in the technical issues, or any other technical support information for a user or household. The customer relationship management system 106 may include additional or alternative databases other than the databases 202-208.

The customer treatment system 108 includes a customer experience rules engine 210 for enhance the user's experience when managing or manipulating the user's digital footprint. The customer experience rules engine 210 may be configured to control what experience, rights, offers, and opportunities to which the customer is entitled. The customer treatment system 108 may include alternative or additional components other than the customer experience rules engine 210.

The purchase history system 110 includes a products/services purchased database 212 for monitoring and storing the user's purchase history of electronic components or services. The products/services purchased database 212 may also include purchase history information for a household. Alternatively, or in addition, the products/services purchased database 212 store information and details relating to the user's or the household's purchase of electronic components from the third-party product/service provider 146. The purchase history system 110 may include alternative or additional components other than the products/services purchased database 212.

The configuration management system 112 includes a component attributes database 214 and a scan/diagnostics database 216 for managing or providing such information as an electronic component's technical specifications, compatible and incompatible electronic components, the nominal operating parameters for the electronic component, or other technical information. The component attributes database 214 may be configured to store information relating to the attributes of an electronic component and the scan/diagnostics database 216 may be configured to store information relating to scan operations or diagnostic operations performable on the electronic component. The configuration management system 112 may include alternative or additional components other than the databases 214-216.

The product/service data system 114 includes a warranty information database 218 and a product/service detail database 220 for managing or providing details or information relating to an offered electronic component or service. The warranty information database 218 may include warranty information for an offered electronic component or service. The warranty information database 218 may also include warranty information for a purchased electronic component or service associated with a user or household. The product/service detail database 220 may include product and service detail for an offered or purchased electronic component or an offered or purchased service. The product/service detail database 220 may include such information as pricing information, availability information, discount information, or other information relating to the electronic component or service. The product/service data system 114 may include alternative or additional components other than the databases 218-220.

The drivers/updates system 116 includes a software drivers/updates database 222 and a replacement/add-on parts database 224 for managing or providing information relating to software drivers and/or software updates for an electronic component, or for information relating to additional or replacement parts for the electronic component. The software drivers/updates database 222 may maintain information relating to software drivers and/or updates for a purchased electronic component or an offered electronic component. The replacement/add-on parts database 224 may maintain information relating to the availability of replacement parts or add-on parts for a purchased, or offered, electronic component. The drivers/updates system 116 may include alternative or additional components other than the databases 222-224.

The resolution paths system 118 includes an issue diagnosis database 226 and an instructional database 228 for managing or providing information relating to diagnosing or troubleshooting errors with an electronic component or service, and for managing or providing educational information relating to the electronic component or service. The issue diagnosis database 226 may include logic flow information or other troubleshooting information for diagnosing or determining the cause of an error or issue with an electronic component. The instructional database 228 may include tips or other useful information describing how an electronic component may be used to accomplish a variety of tasks. For example, the instructional database 228 may include information relating to how a user may use a digital video camera to record video. The instructional database 228 may also include information about other electronic components other than the digital video camera. The resolution paths system 118 may include alternative or additional components other than the databases 226-228.

The purchasing system 120 includes a new products/services database 230 for managing and providing information relating to offers to purchase electronic components or services from the primary provider. The new products/services database 230 may maintain orders to purchase or offers to purchase electronic components or services from the primary provider. The orders to purchase or offers to purchase may be associated with a user profile, a household profile, or both. The purchasing system 120 may include alternative or additional components other than the new products/services database 230.

Figure 3:
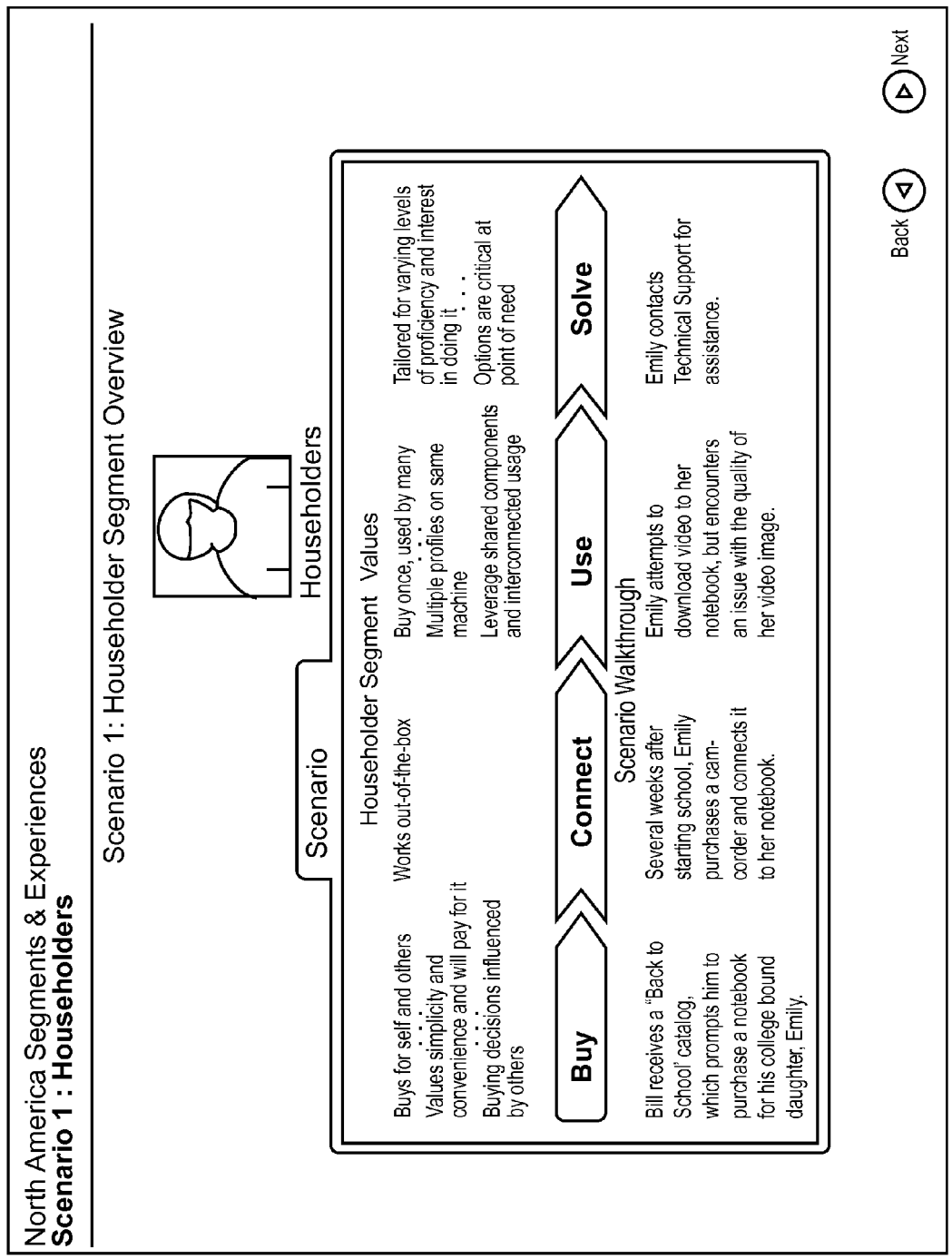
FIG. 3 shows one example of a family from a household segment.

The household electronic component system 148 may be associated with different types of households that have different sets of values. FIG. 3 shows one example of a family from a household segment that has a set of values with regard to the various stages of using an electronic component. FIG. 3 also describes a scenario in which a father, Bill Watson, decides to buy a notebook for his daughter, Emily. FIGS. 4-16 further describe this scenario. The scenario includes Bill Watson receiving a mailer advertising a notebook, which he decides to purchase for Emily. The scenario also includes Emily ordering a digital camcorder and then having difficulties in using the camcorder. The scenario also presents an example of Emily contacting a customer support technician to resolve the issues and errors she is having with her newly purchased digital video camcorder. In addition to presenting this scenario, FIGS. 4-16 illustrate the various aspects and features provided by the digital footprint driven multi-channel integrated support system 102.

Figure 4:
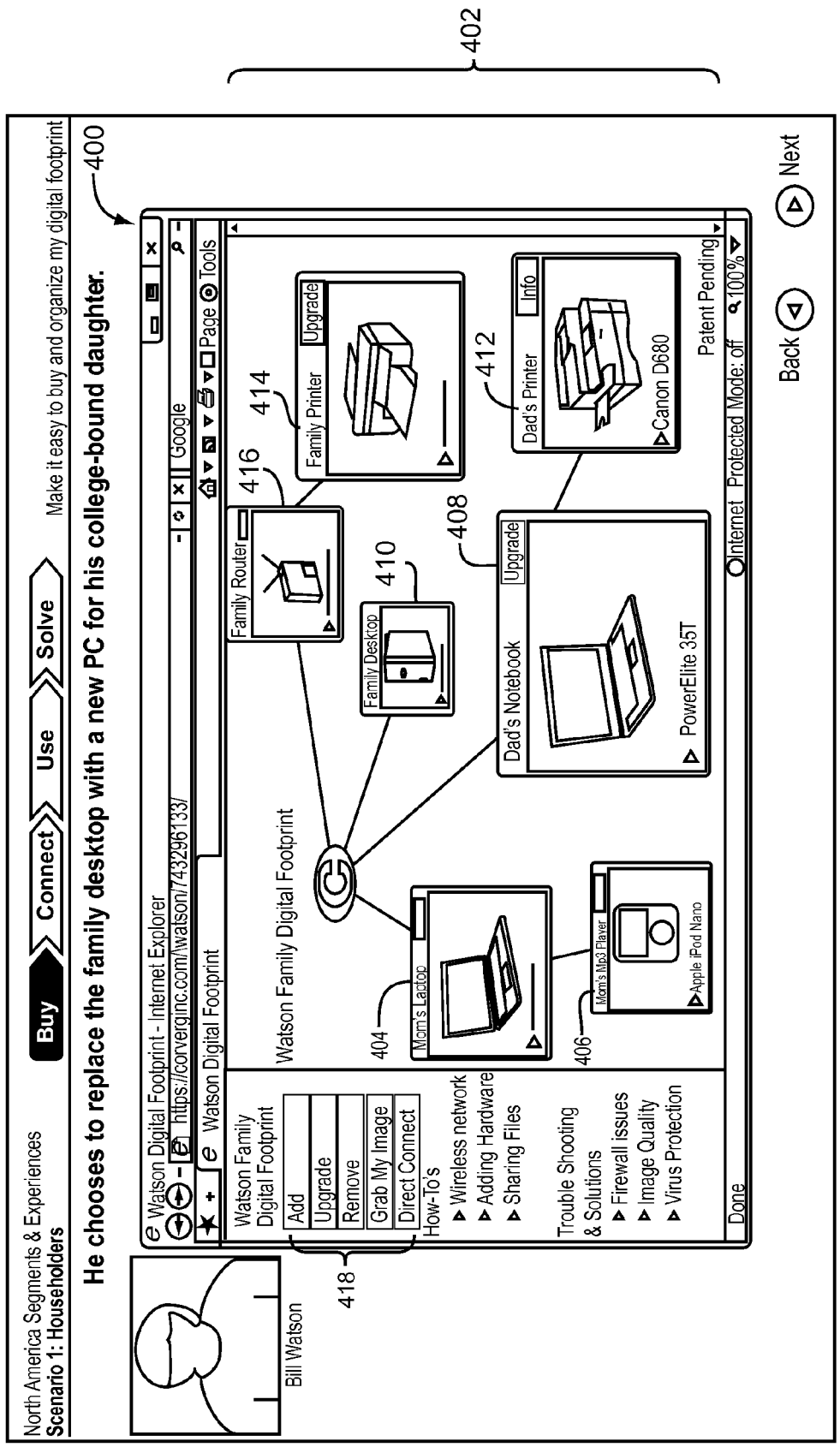
FIG. 4 shows one example of a local digital footprint graphical user interface that displays a digital footprint for the family described in FIG. 3.

FIG. 4 shows one example of a local digital footprint graphical user interface 400 that displays a local digital footprint 402 for the household profile of the family described in FIG. 3. In displaying the local digital footprint 402, the digital footprint portal 104 may communicate with one or more customer support systems 106-120 to retrieve information relating to the digital footprint of the household. The digital footprint portal 104 may then initiate the display of the local digital footprint 402 through the local digital footprint graphical user interface 400.

The local digital footprint graphical user interface 400 displays a graphical representation of the electronic components 404-416 of the local digital footprint 402. A user, such as Bill Watson, may then manipulate the representation of the local digital footprint 402. For example, Bill may replace, update, upgrade, migrate, remove, or otherwise manipulate, any one of the electronic components 404-416 shown in the local digital footprint 402.

The local digital footprint graphical user interface 400 also includes a local digital footprint control panel 418 for manipulating the local digital footprint 402. The local digital footprint control panel 418 includes various options for the user to manipulate the local digital footprint 402. The various options of the local digital footprint control panel 418 may include: an add option to add an electronic component to the local digital footprint 402; an upgrade option to upgrade an electronic component of the local digital footprint 402; a remove option to remove an electronic component from the local digital footprint 402; a grab option to copy data and settings off an existing electronic component for such uses as backup/restore, new component migration, or other operations; and, a direct connect option to directly connect to another digital footprint (local or remote). The digital footprint control panel 418 may include alternative options than the options shown in FIG. 4.

Figure 5:
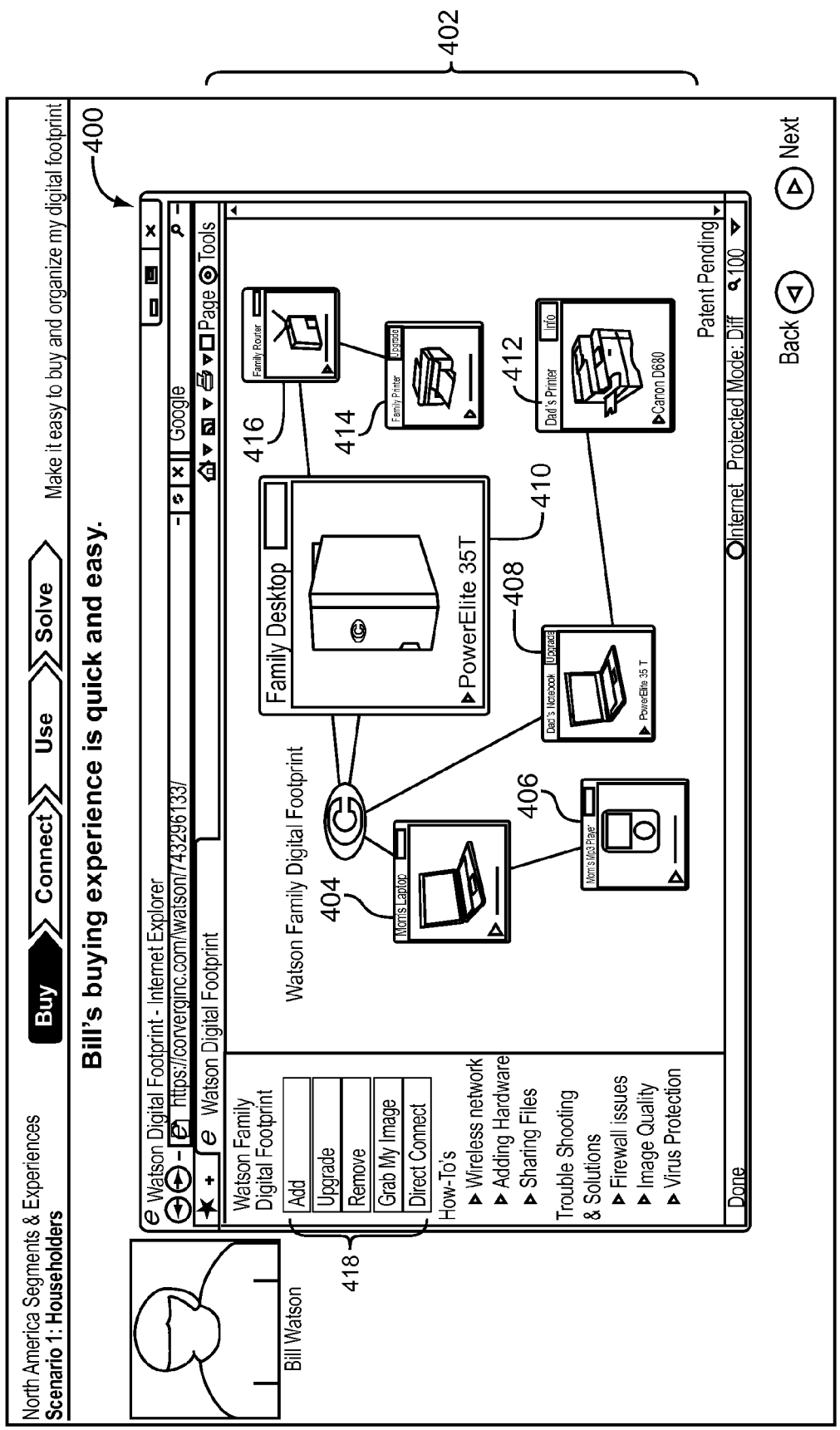
FIG. 5 shows the local digital footprint graphical user interface of FIG. 4 where the family desktop computer is selected.

FIG. 5 shows the local digital footprint graphical user interface 400 of FIG. 4 where the family desktop computer 410 is selected. As previously discussed, Bill has decided to replace the family desktop computer 410 with a new notebook for his daughter. In the example shown in FIG. 5, Bill has selected the family desktop computer 410. In purchasing the new notebook for his daughter, Bill may communicate with the digital footprint driven multi-channel integrated support system 102 of a primary provider, in this case, ConvergInc. While communicating with the digital footprint driven multi-channel integrated support system 102, the digital footprint portal 104 may initiate the display of various graphical user interfaces to assist Bill.

Figure 6:
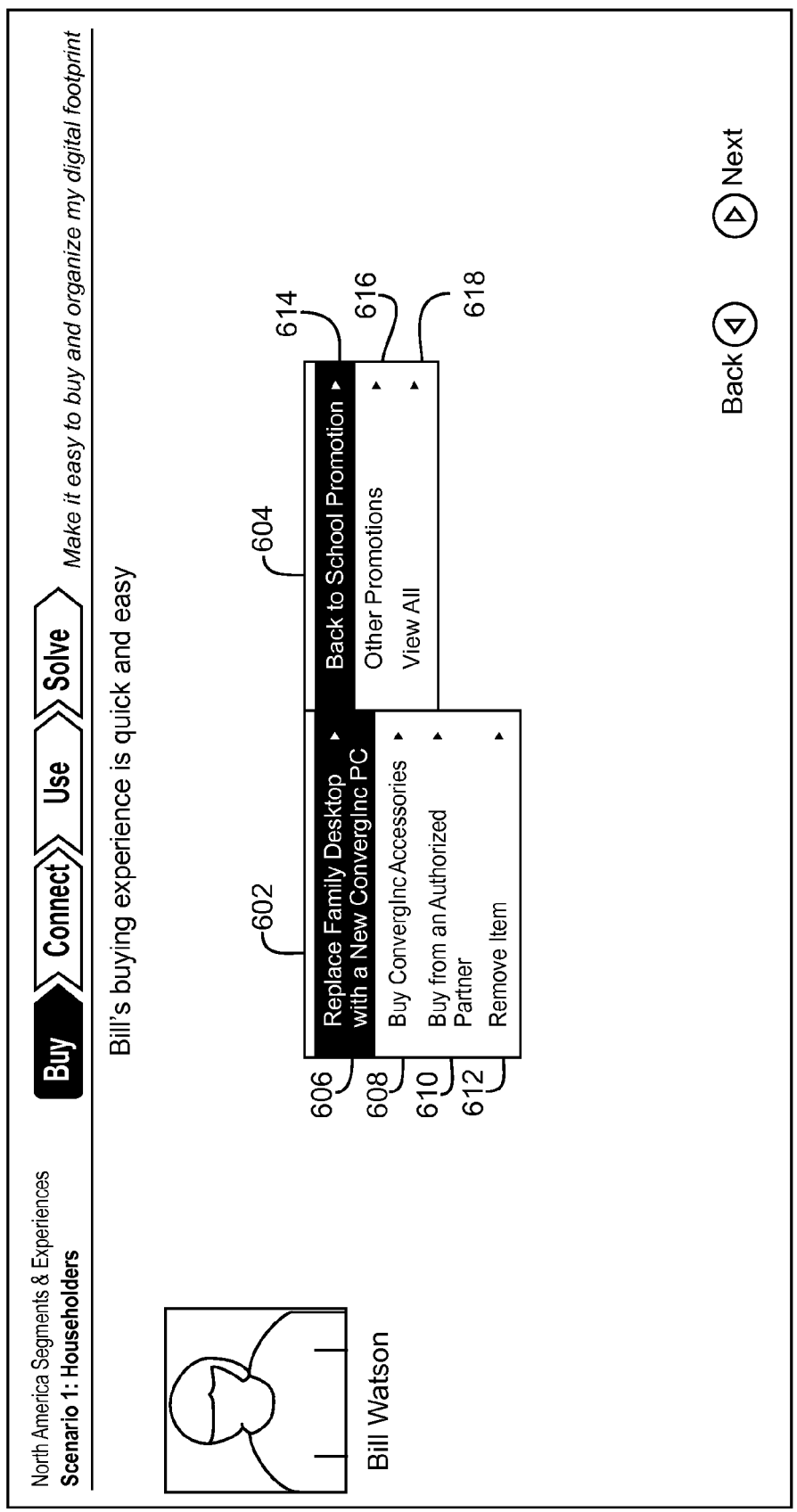
FIG. 6 shows one example of local digital footprint graphical user interface menus for manipulating an electronic component shown in the graphical user interface of FIG. 4.

FIG. 6 shows one example of local digital footprint graphical user interface menus 602-604 for manipulating an electronic component shown in the graphical user interface 400 of FIG. 4. The digital footprint portal 104 may be configured to initiate display of the local digital footprint graphical user interface menus 602-604 based on a request from Bill to upgrade or replace the family desktop 410. Bill may use the local digital footprint graphical user interface menus 602-604 to make his purchase of the new notebook computer.

The local digital footprint graphical user interface menus 602-604 may include primary options 606-612 and secondary options 614-616. The secondary options 614-616 are displayed based on the selected primary option. In one implementation, the primary options 606-612 include: a replace option 606 to replace the selected electronic component, a buy-accessory option 608 to buy accessories for the electronic component, an authorized-partner option 610 to purchase an electronic component or service from an authorized third-party provider; and a remove option 612 to remove an electronic component from the local digital footprint. Alternative primary options are also possible.

Each of the primary options 606-612 may be associated with a secondary option. FIG. 6 shows that the replace option 606 is associated with three secondary options 614-618. In one implementation, the secondary options 614-618 associated with the replace option 606 include: a primary promotion option 614 for purchasing an electronic component based on a primary available promotion; a secondary promotion option 616 for purchasing an electronic component based on a secondary available promotion; and, a view-all promotion option 618 that initiates the display of the promotions associated with the replace option 606 and the selected electronic component. Alternative secondary options are also possible.

FIG. 7 shows one example of a notebook recommendation graphical user interface 700 that Bill may use to select and purchase a notebook available from his primary provider. In one implementation, the notebook recommendation graphical user interface 700 includes an upgrade option control panel 702 that provides several upgrade options for a selected notebook and a notebook selection control panel 704 that provides several notebook computers for selection. The options displayed in the notebook selection panel 704 and the options displayed in the upgrade option control panel 702 may be based on information stored in one or more of the customer support systems 106-120, such as the purchasing system 120 or the product/service data system 114.

Figure 8:
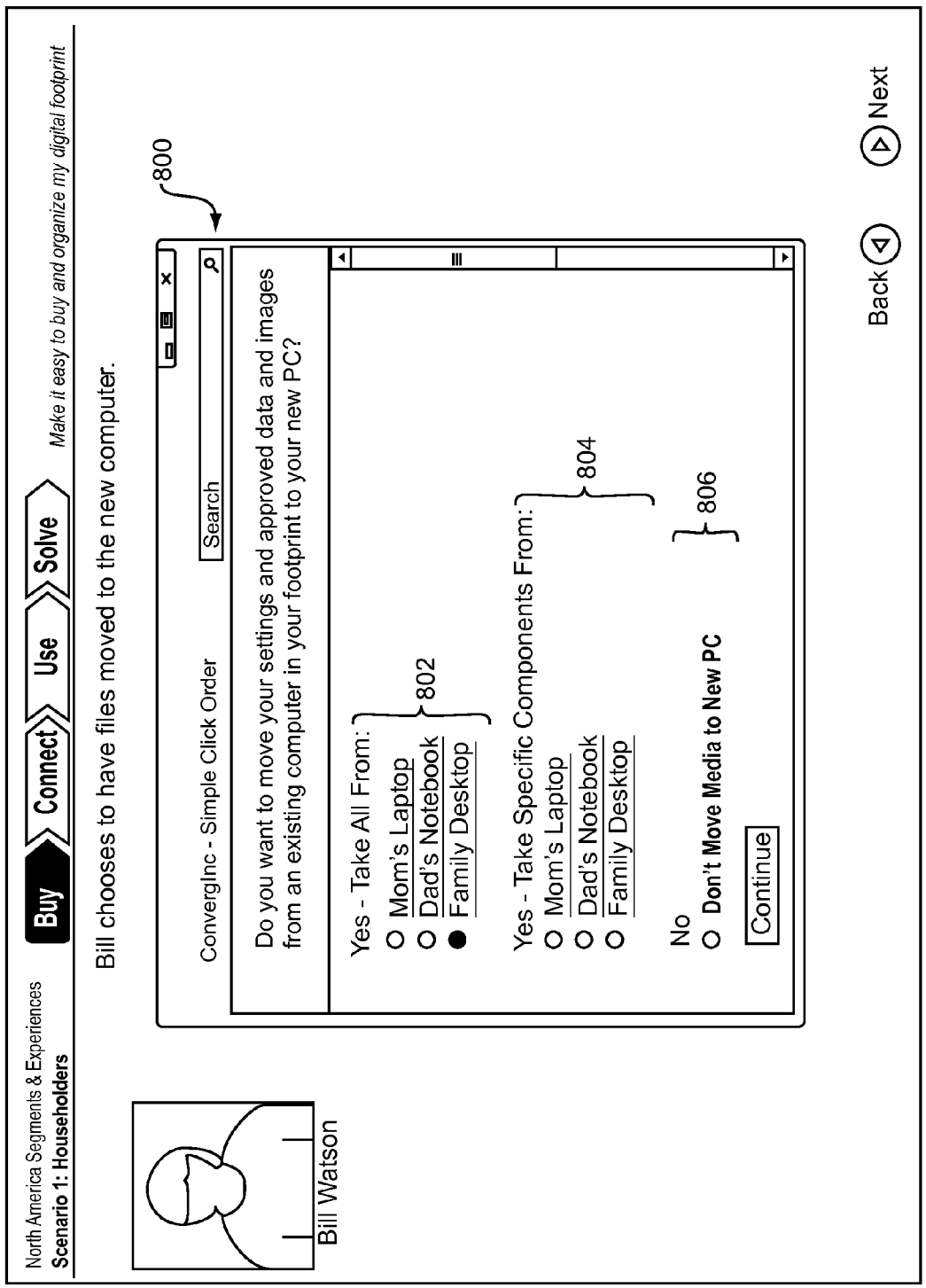
FIG. 8 shows one example of a migration graphical user interface that assists in migrating data from one electronic component to a second electronic component.

FIG. 8 shows one example of a migration graphical user interface 800 that assists Bill in migrating data from the family desktop computer 410 to the purchased notebook. In one implementation, the migration graphical user interface 800 includes various option control panels 802-806 for selecting data to migrate from the family desktop computer 410, or any other electronic component, to the purchased notebook. The option control panels 802-806 may include options for selecting a source electronic component from which data is migrated and options for selecting the amount of data migrated from the source electronic component. For example, the option control panels 802-806 may include a complete migration control panel 802 for migrating all the data from a selected source electronic component, a partial migration control panel 804 for migrating a selected set of data from a selected source electronic component, and a declined migration control panel 806 for indicating that no data is to be migrated from any electronic component. Other combinations of option control panels are also possible. In the Watson scenario, Bill has selected to migrate all of the data from the family desktop computer 410 to the purchased notebook computer.

Figure 9:
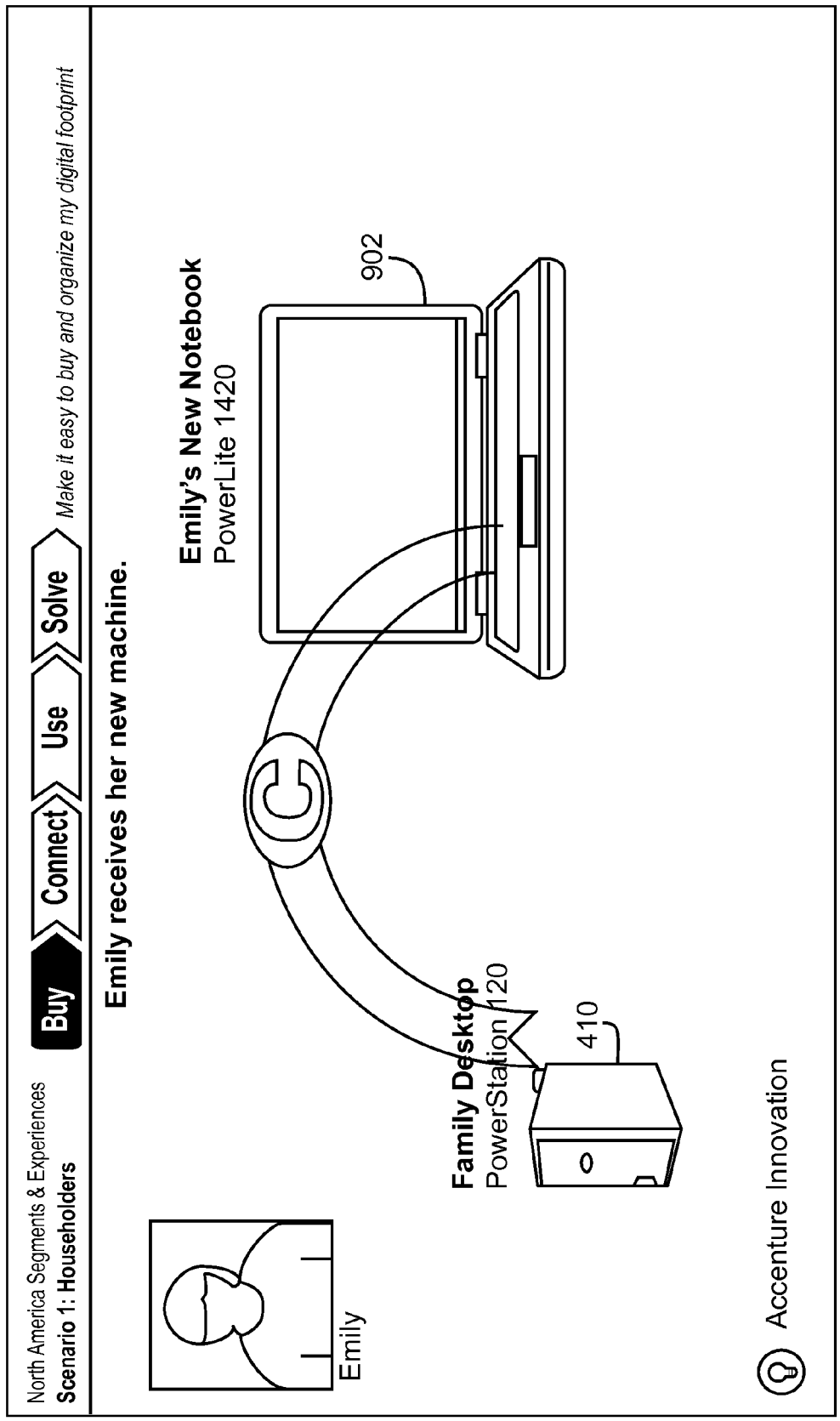
FIG. 9 shows one example of migrating data based on the selection made in FIG. 8.

FIG. 9 shows one example of migrating the data from the family desktop computer 410 to the purchased notebook computer 902 based on the selection made in FIG. 8. In one implementation, the digital footprint portal 104 migrates data directly from the family desktop computer 410 to the purchased notebook computer 902. In other implementations, the digital footprint portal 104 may store a temporary copy of the data from the family desktop computer 410 before transferring the date to the purchased notebook computer 902. Alternatively, the digital footprint portal 104 may communicate with one or more of the customer support systems 106-120 to assist in migrating the data from the family desktop computer 410 to the purchased notebook computer 902.

As shown in the FIGS. 4-9, Bill's buying experience is simple, convenient, and tailored to delight. The buying experience is personable, scalable globally, and provides additional insights into the user. The buying experience may include may different resources including a customer analytic record, an anonymous or segment-tailored website, a direct connect inventory with network crawlers, a wisdom-of-the-crowd generator, and a targeted and tailored cross-sell engine.

Figure 10:
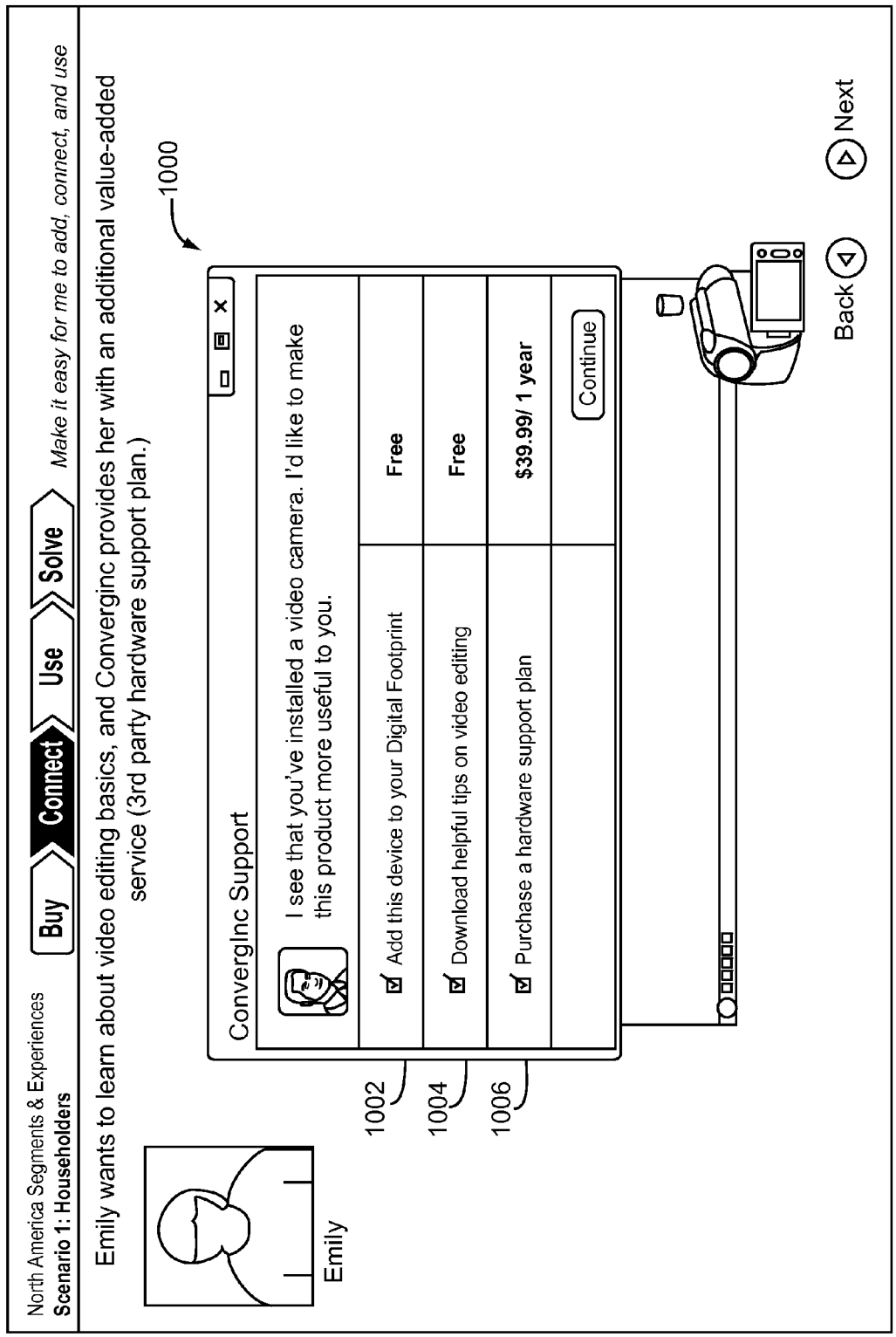
FIG. 10 shows one example of a support graphical user interface that assists in selecting various support options.

After Emily takes possession of the notebook computer 902, she decides to purchase a digital video camcorder and connects it to her new notebook computer 902. She also wants to learn about digital video editing, and the digital footprint driven multi-channel integrated support system 102 provides several support channels from which she may learn about digital video editing. FIG. 10 shows one example of a support graphical user interface 1000 that assists Emily in selecting various support options 1002-1006 to support her newly purchased digital video camcorder. The support options may include an option 1002 for adding the digital video camcorder to Emily's or the household's digital footprint, an option 1004 for downloading helpful hints on video editing, and an option 1006 for purchasing a hardware support plan to support hardware issues or errors with the digital video camcorder. In other implementations, the support graphical user interface 1000 includes alternative support options.

Figure 11:
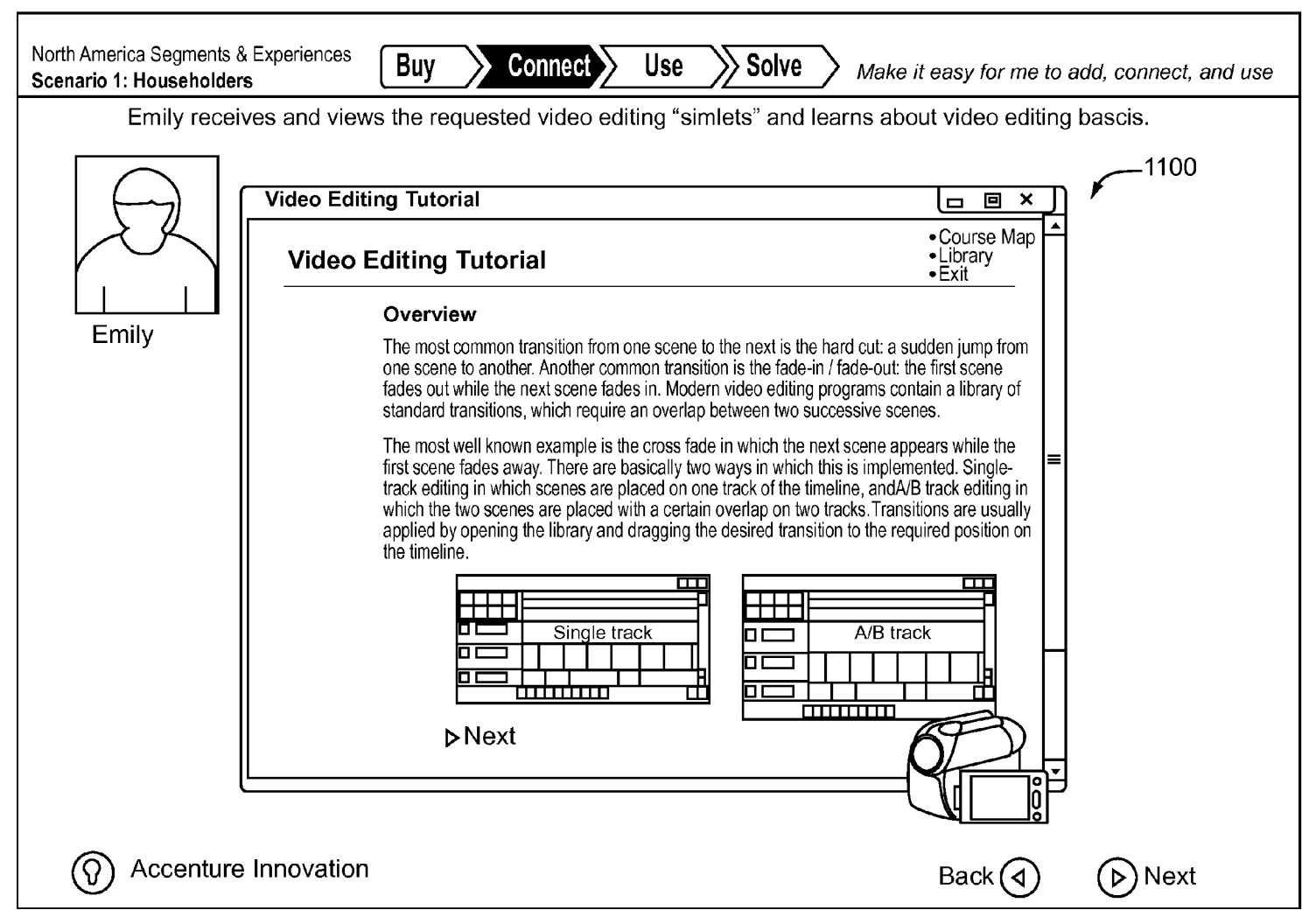

Emily decides to use the support graphical user interface 1000 to select the option 1004 for downloading helpful hints in video editing. FIG. 11 shows one example of an educational graphical user interface 1100 that displays educational information about digital video editing. In other implementations, the educational graphical user interface 1100 may display educational information about other topics, such as word processing, formatting a hard drive, connecting audio equipment, or any other educational topic.

With the digital footprint driven multi-channel support system 102, the primary provider becomes a part of the user's daily digital lifestyle, both when the user is connected and when the user is mobile. In becoming a part of the user's daily digital lifestyle, the digital footprint driven multi-channel support system 102 may use segment and system-driven user "simlets," a communication toolkit, and a dialog coach training simulation tool. The digital footprint driven multi-channel support system 102 may also implement a simlet design, development, and execution infrastructure.

Figure 12:
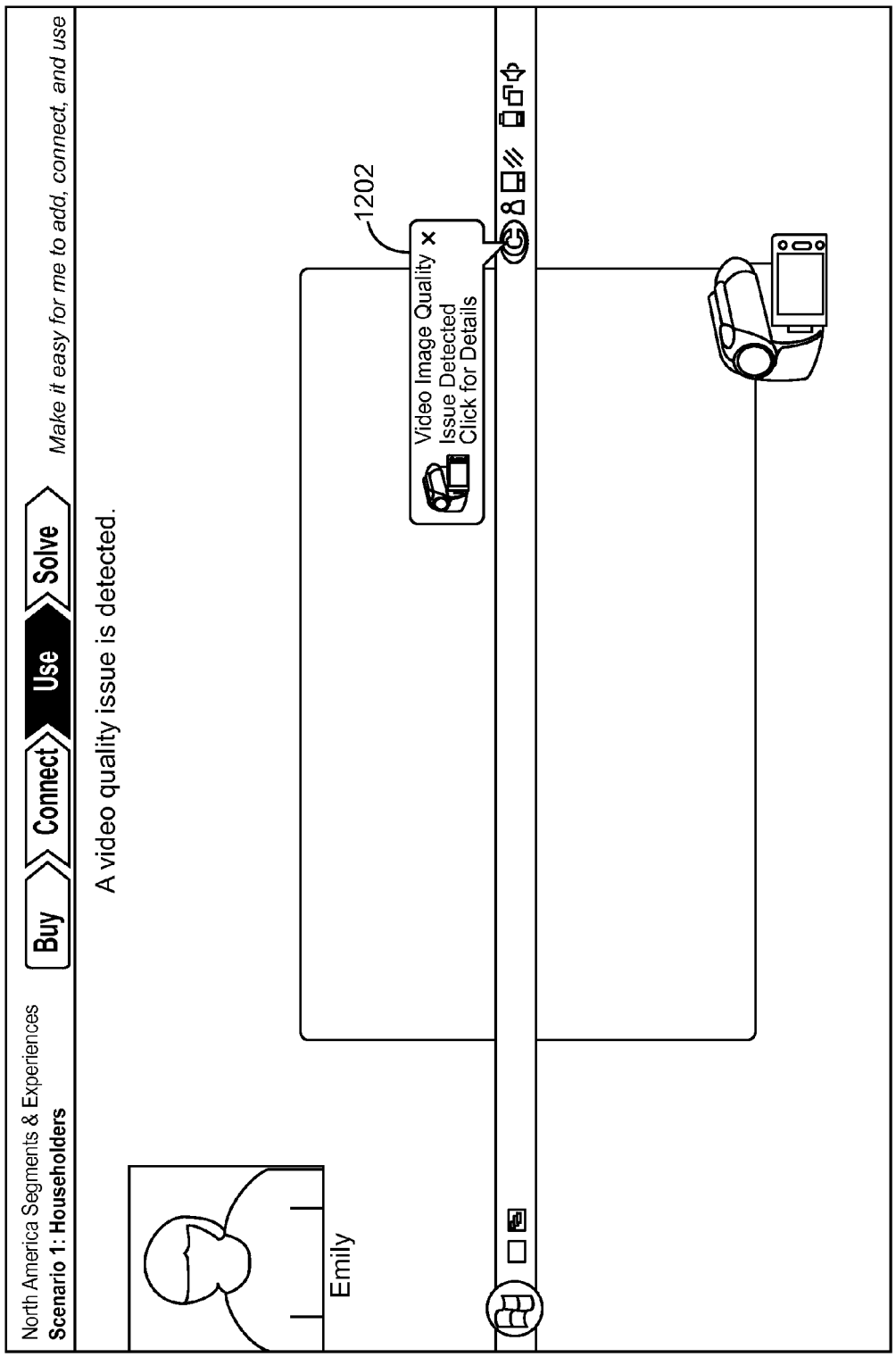
FIG. 12 shows one example of an error notification that notifies a user of an error with an electronic component.

While Emily is using her new digital video camcorder, she experiences a technical problem with the digital video camcorder. FIG. 12 shows one example of an error notification 1202 that notifies Emily of an error with digital video camcorder. As shown in the FIG. 12, the error notification 1202 notifies Emily that there is an issue detected with the video image quality. The display of the error notification 1202 may be based on when the performance characteristics of the digital video camcorder deviate from a pre-defined standard.

Figure 13:
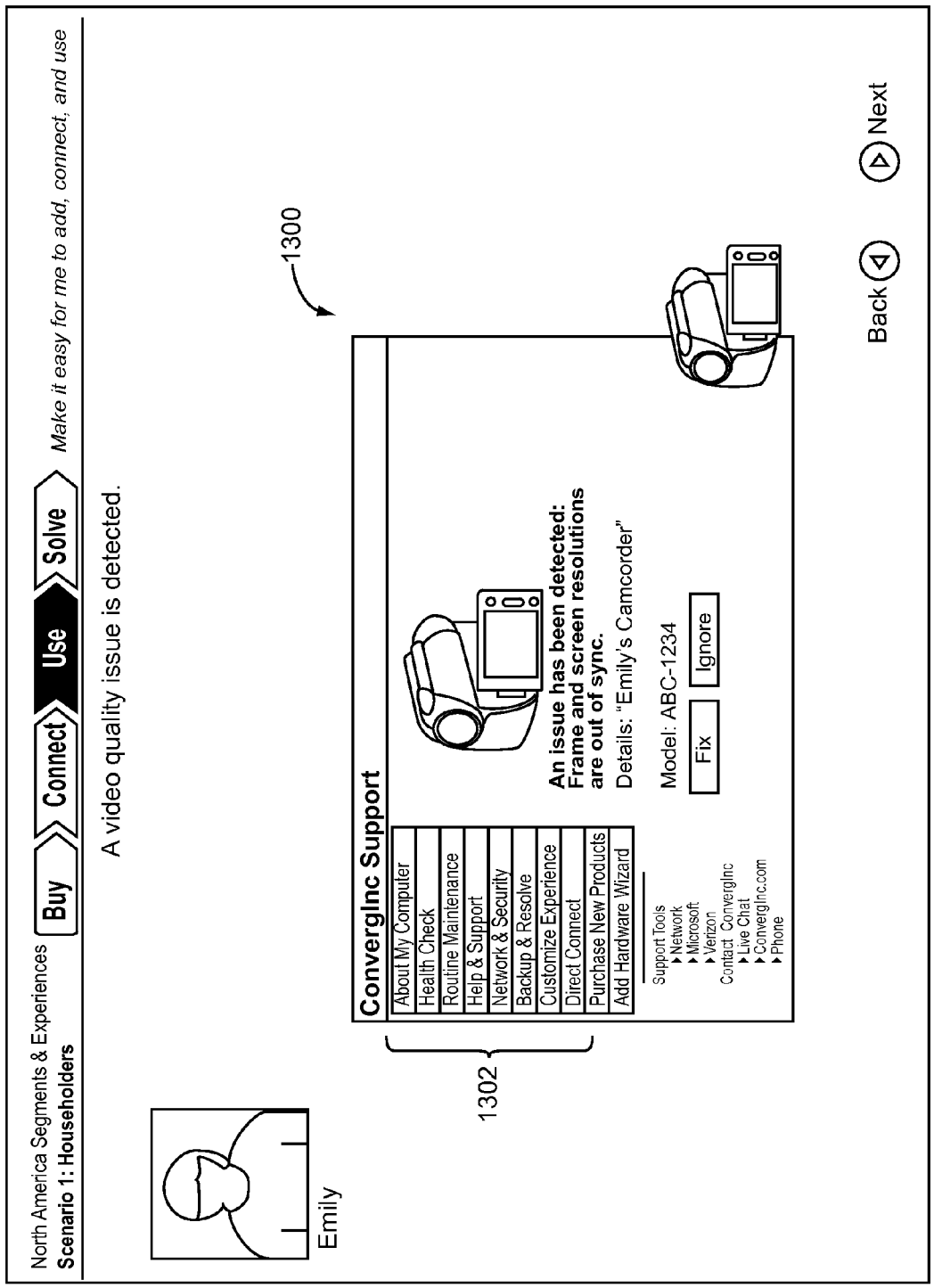
FIG. 13 shows one example of an issue detection graphical user interface that displays information relating to the detected error shown in FIG. 12.

The detection of the issue with the digital video camcorder may be performed by local software residing on the notebook computer 902, by the digital footprint portal 104, or any of the customer support systems 106-120. The local software client may also reside on a Flash drive or other portable media. FIG. 13 shows one example of an issue detection graphical user interface 1300 that displays information relating to the detected error shown in FIG. 12. The issue detection graphical user interface 1300 may display specific information about the detected issue or error and information about the electronic component that encountered the error. FIG. 13 shows that the issue detection graphical user interface 1300 displays that the specific issue relates to the frame and screen resolutions, and that specific model of the digital video camcorder is an ABC-1234.

The issue detection graphical user interface 1300 also includes a support control panel 1302 that provides various support options for an electronic component. In one implementation, the support options include obtaining information about the electronic component, performing a health check on the electronic component, performing routine maintenance on the electronic component, obtaining help and support for the electronic component, obtaining network and security information for the electronic component, performing a backup and resolve routine on the electronic component, directly connecting to another electronic component, and adding new hardware to the electronic component. In alternative implementations, the support control panel 1302 may include alternative support options.

Figure 14:
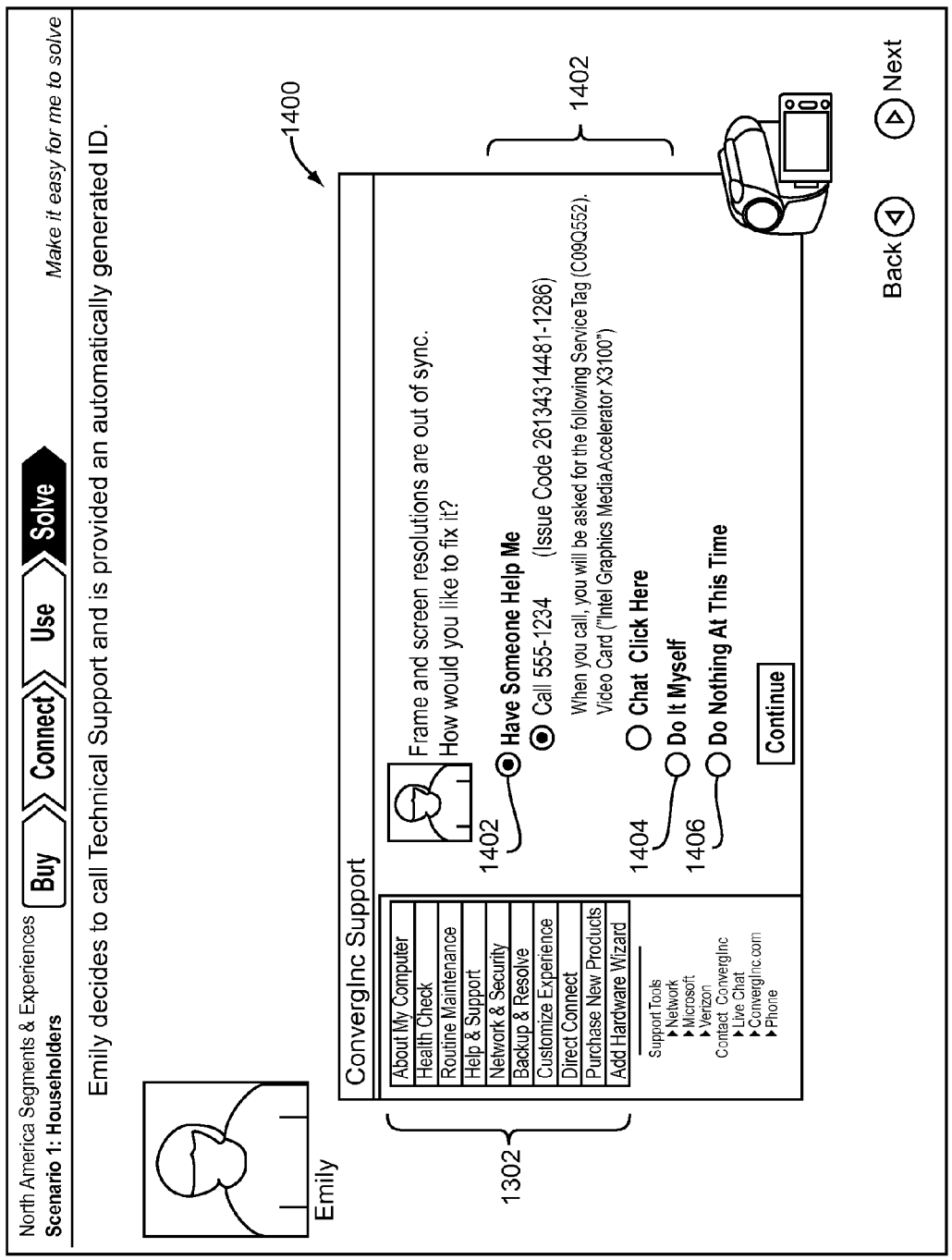
FIG. 14 shows one example of a diagnosis option graphical user interface that assists in diagnosing the detected error shown in FIG. 12.

Continuing the scenario, Emily has chosen to fix the issue with her digital video camcorder. FIG. 14 shows one example of a diagnosis option graphical user interface 1400 that assists Emily in diagnosing the detected error shown in FIG. 12. In one implementation, the diagnosis option graphical user interface 1400 displays a diagnosis control panel 1402 that presents several diagnosis options 1402-1406 for Emily to choose from in diagnosing the cause of the error with the digital video camcorder. The diagnosis options 1402-1406 may include an outside-help option 1402 for Emily to obtain help from a customer support technician, a self-help option 1404 for Emily to attempt to fix the error herself, and a decline option 1406 for Emily to decline support with the error. In alternative implementations, the diagnosis control panel 1402 may include alternative diagnosis options.

Figure 15:
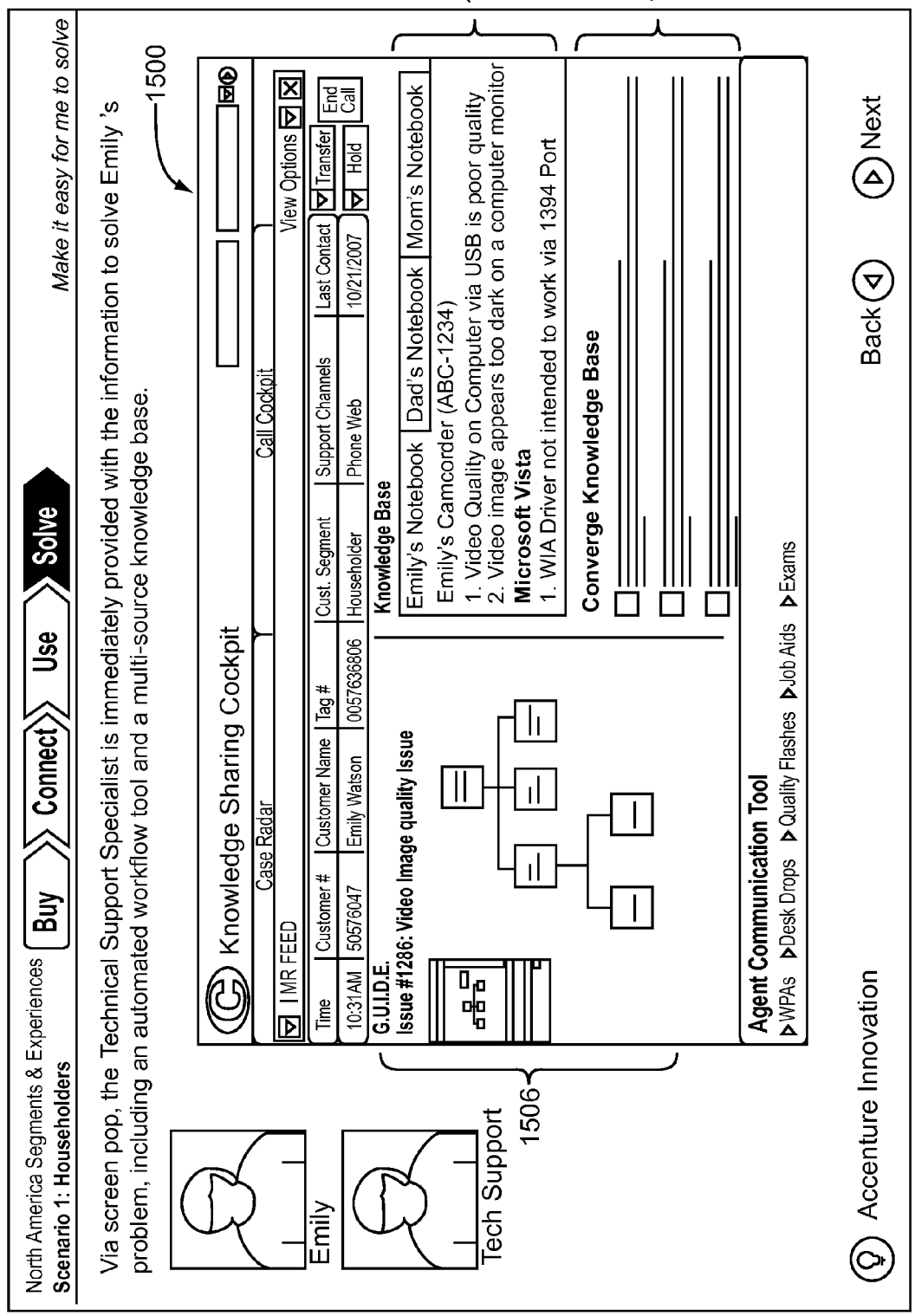
FIG. 15 shows one example of a knowledge sharing cockpit graphical user interface for accessing a knowledge database relating to the electronic component of FIG. 13.

Emily selects the option to have a customer support technician assist her. FIG. 15 shows one example of a knowledge sharing cockpit graphical user interface 1500 that for accessing a knowledge database relating to Emily's notebook computer 902 and her digital video camcorder. The knowledge sharing cockpit graphical user interface 1500 includes a general knowledge base display section 1502 that display general information regarding the electronic components in the household electronic component system, a primary provider knowledge base display section 1504 that displays internal troubleshooting information gathered by the primary provider, and a guided resolution display section 1506 that guides a user or customer support technician through various steps to resolve the detected error. The knowledge sharing cockpit graphical user interface 1500 may be displayed by the digital footprint portal 104, any of the customer support system 106-120, by a household electronic component, such as the notebook computer 902, or any other system. The knowledge sharing cockpit graphical user interface 1500 may be accessible to the user, such as Emily, or a customer support technician that assists Emily in resolving her issue.

Through local software residing on the notebook computer 902 and the digital footprint portal 104, the primary provider is able to provide integrated multi-channel support to solve a user's issue quickly and accurately. The primary provider may use tools such as predictive monitoring and auto-resolve via a remote service, a dynamic front door that includes both a web interface and an IVR, an agent preparation system, an agent cockpit, direct connect inventory, a wisdom-of-the-crowd generator, and a targeted and tailored cross-sell engine. The attributes of the dynamic front door may include a VXML IVR platform, a voice-based persona, a customer auto-identification, a predictive IVR capability, or other attributes. The attributes of the agent preparation system may include a behavioral prediction of level of fluency and intent, a voice pattern recognition system that determines heightened agitation levels, a primary router that selects the "best quality/cost" agent, customer pathways that are saved for future reference, or other attributes. The attributes of the agent cockpit may include a customer contact framework multi-application frame, a customer snapshot that provides customer and segment information, a workflow for unfamiliar tasks, dynamically-presented information on dialog, systems, and configurations, agent-tailored simlets, desk drops, and service alerts, or other attributes.

Figure 16:
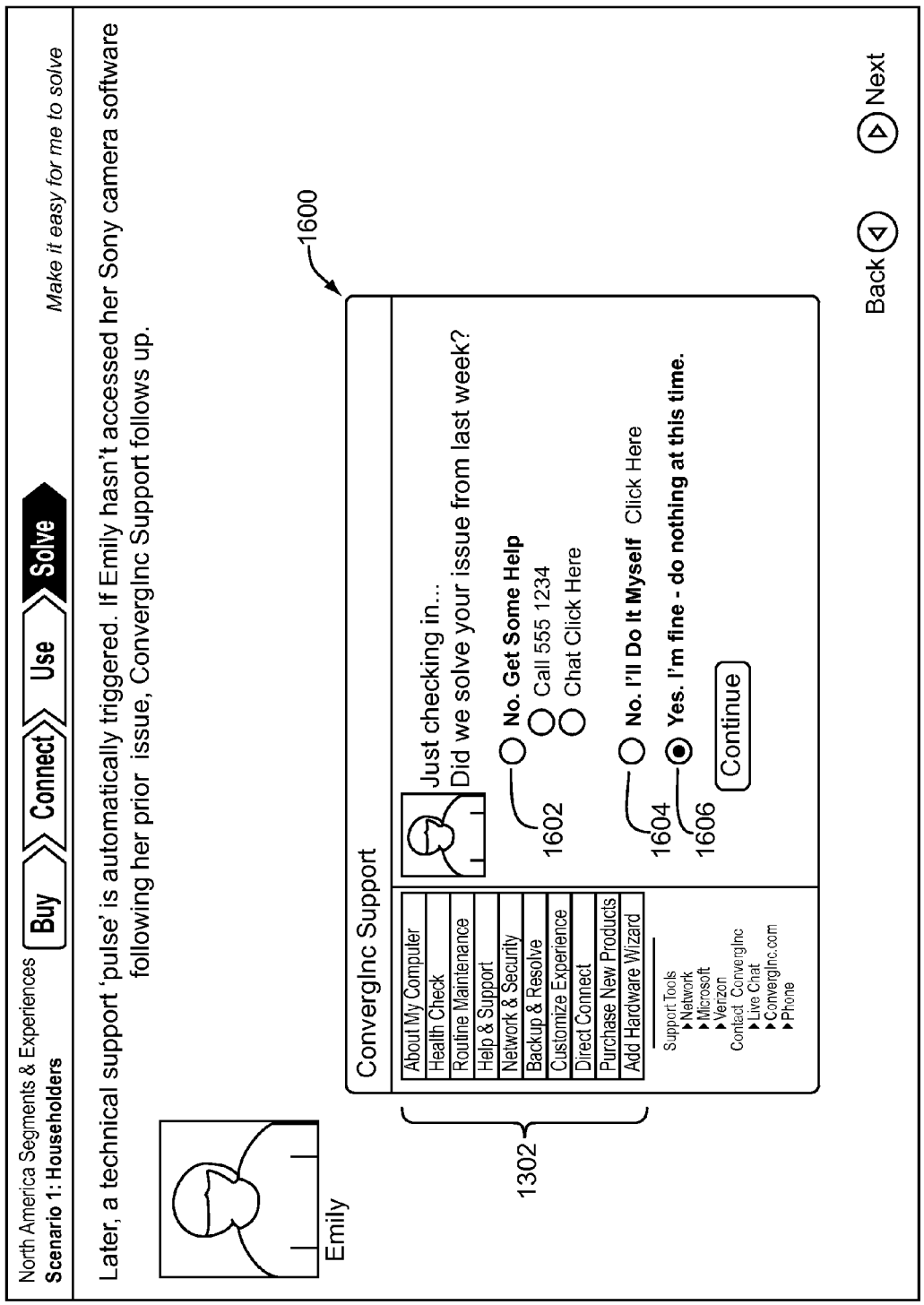
FIG. 16 shows one example of a follow-up support graphical user interface that assists in determining whether the detected error shown in FIG. 12 was resolved.

After resolving Emily's issue, the primary provider may follow-up with Emily to determine whether the issue has recurred. FIG. 16 shows one example of a follow-up support graphical user interface 1600 that assists in determining whether the detected error shown in FIG. 12 was resolved. The follow-up support graphical user interfaced 1600 may display follow-up support options 1602-1606 for Emily to select in providing the primary provider with follow-up information. The follow-up support options 1602-1606 may include a outside-help option 1602 to indicate to the primary provider that additional outside help is required, a self-help option 1604 to indicate to the primary provider that the user will resolve the issue herself, and a resolved option 1606 to indicate to the primary provider that the issue was resolved and that the user does not need outside help. Alternative follow-up support options are also possible.

The Watson scenario illustrates how configuring unique capabilities creates a differentiating experience with this target segment. During the purchasing phase, the digital footprint driven multi-channel support system 102 provides a streamlined buying experience, assists a user in buying electronic component for himself or for another, provides a relevant, bundled upsell, and provides a convenience to users. During the connect phase, the digital footprint driven multi-channel support system 102 provides a truly personalized experience that works out-of-the-box, and a pre-configuration that makes connection easy. During the use phase, the digital footprint driven multi-channel support system 102 provides, a buy once, used by many experience, has a wide variety of uses, and creates vendor affinity at the center of the "Use" experience. During the solve phase, the digital footprint driven multi-channel support system 102 provides an experience tailored to multiple levels of technical proficiency and interests, multiple options to solve an issue on a user's terms, and helps a user get to the cause of the problem and resolve it quickly.

Figure 17:
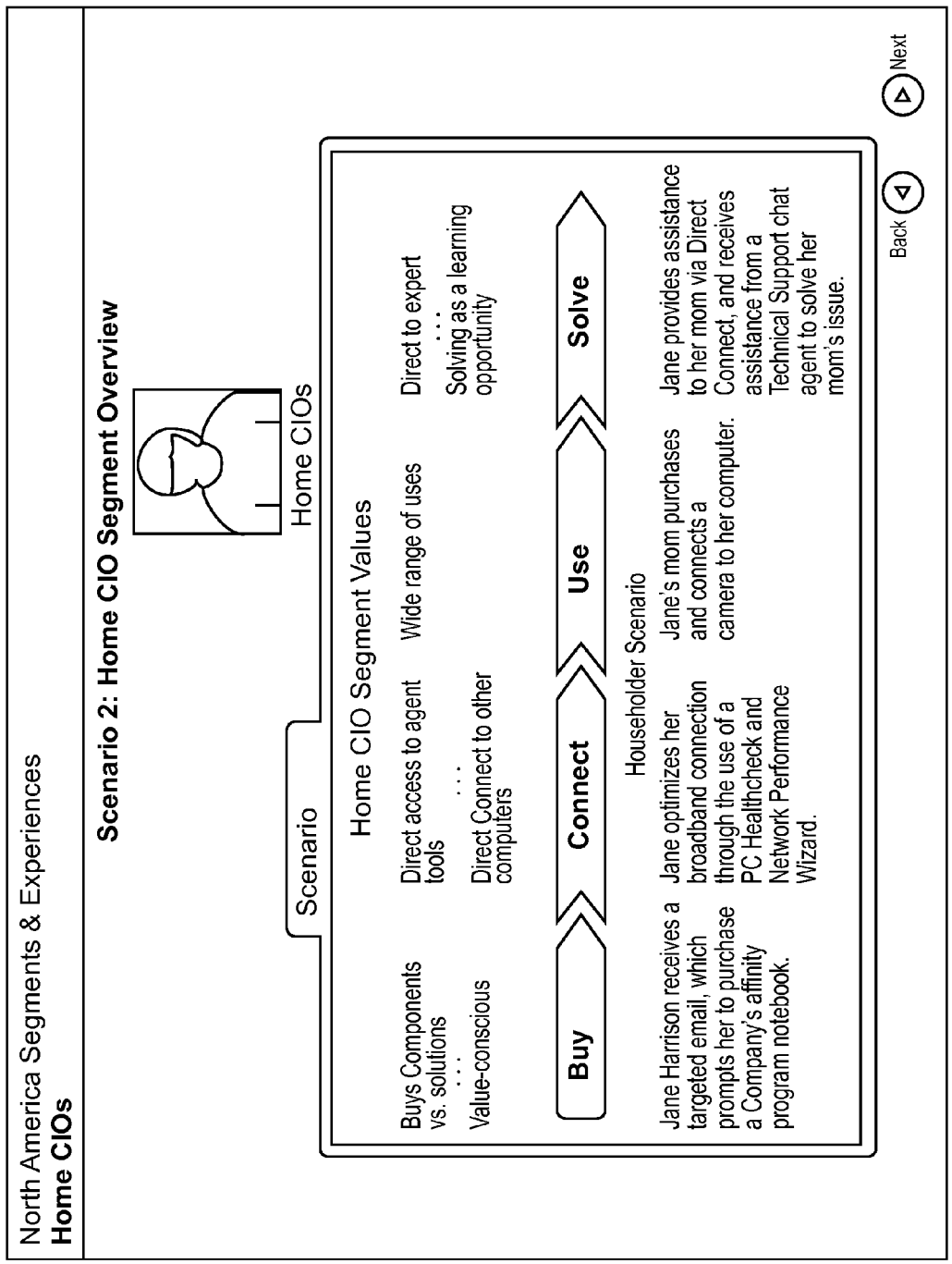
FIG. 17 describes one example of a person that falls into the home CIO segment of users.

The Watson scenario is one example of a household segment. There are other household segments as well. For example, there is also a Home CIO segment of users that purchase and use electronic components. FIG. 17 describes one example of a person that falls into the home CIO segment of users. FIG. 17 presents the scenario of Jane Harrison and some of the issues she may encounter with a notebook computer she recently purchased. FIG. 17 also presents a situation where Jane's mother asks her to help resolve an issue with Jane's mother's computer.

Figure 18:
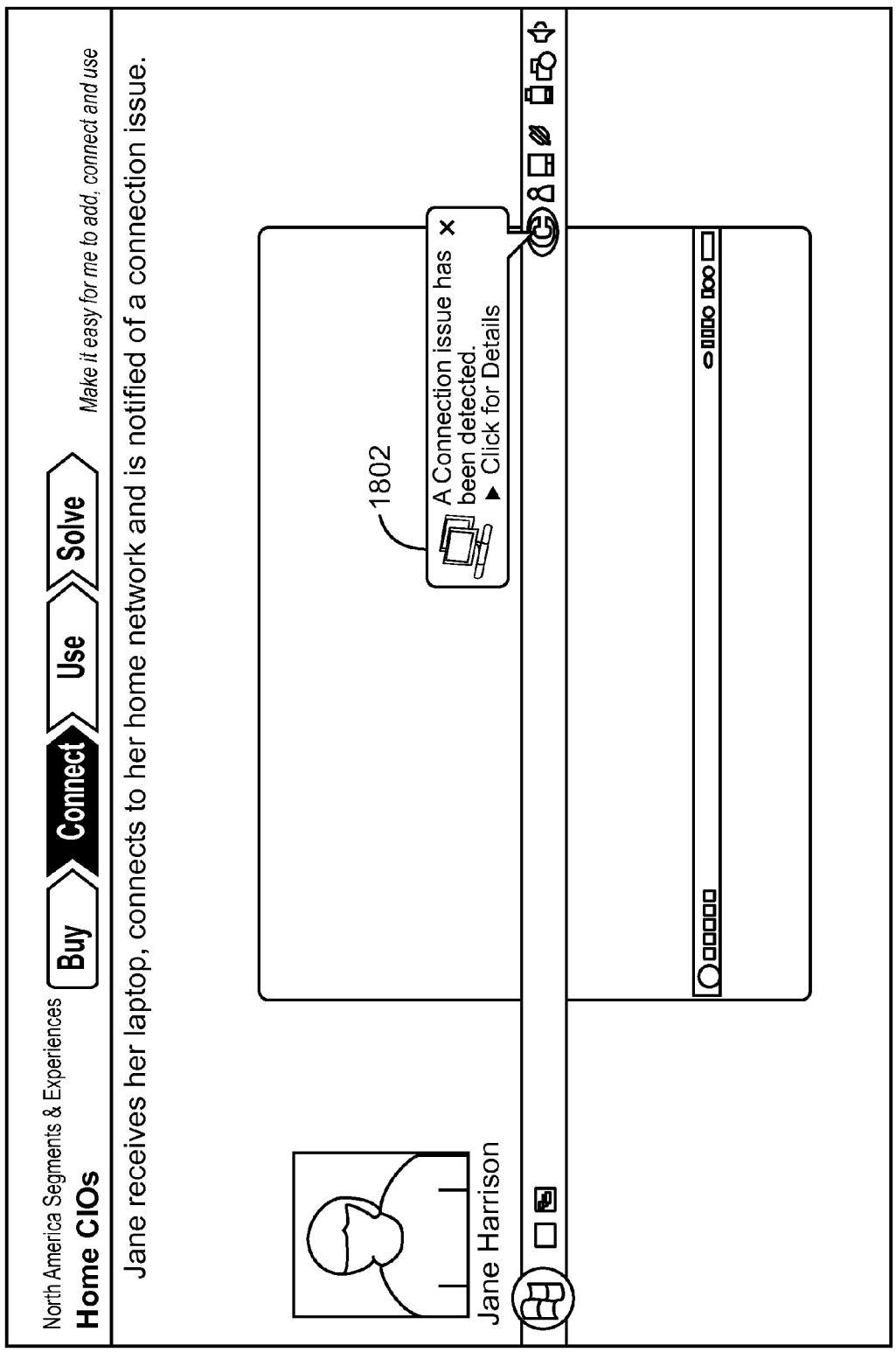
FIG. 18 shows another example of an error notification that notifies a user of an error with an electronic component

Jane has recently purchased a notebook computer and has integrated the notebook computer into her local digital footprint. However, unbeknownst to Jane, there is a network connectivity problem with her notebook computer. However, her primary provider of electronic components has provided her with "on-the-box" software to detect whether the network connection is operating according to a pre-defined standard. FIG. 18 shows an error notification 1802 that notifies Jane that there is an issue with her network connection. The display of the error notification 1802 may be prompted by the local software residing on her notebook computer, by the digital footprint portal 104 connected to her notebook computer, or any of the customer support system 106-120.

Figure 19:
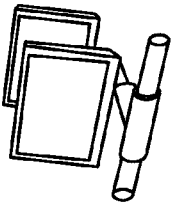
FIG. 19 shows one example of a network connection graphical user interface that assists the user in resolving the network connection error shown in FIG. 18.

FIG. 19 shows one example of a network connection graphical user interface 1900 that assists Jane in resolving the network connection error shown in FIG. 18. The network connection graphical user interface 1900 displays that the specific error with the notebook computer's network connection is that the throughput of the notebook computer is below broadband thresholds.

Jane decides to determine whether her notebook computer is operating within acceptable parameter levels. Jane runs a system health program provided by her primary provider that helps her make this determination. FIG. 20 shows one example of a system health graphical user interface 2000 that displays system-health related information regarding Jane's notebook computer. The system-health graphical user interface 2000 includes a system status display section 2002 that displays system status information, a network status display section 2004 that displays network status information, a security status display section 2006 that display security status information, a maintenance display section 2008 that displays maintenance information, and a result display section 2010 that displays information relating to the results of running the system health program. FIG. 20 further shows that the network status display section 2004 displays that there is a problem with the notebook computer's network throughput, and that the result display section 2010 displays that the network connectivity of the notebook computer has dropped eight times in the past forty-eight hours.

Figure 21:
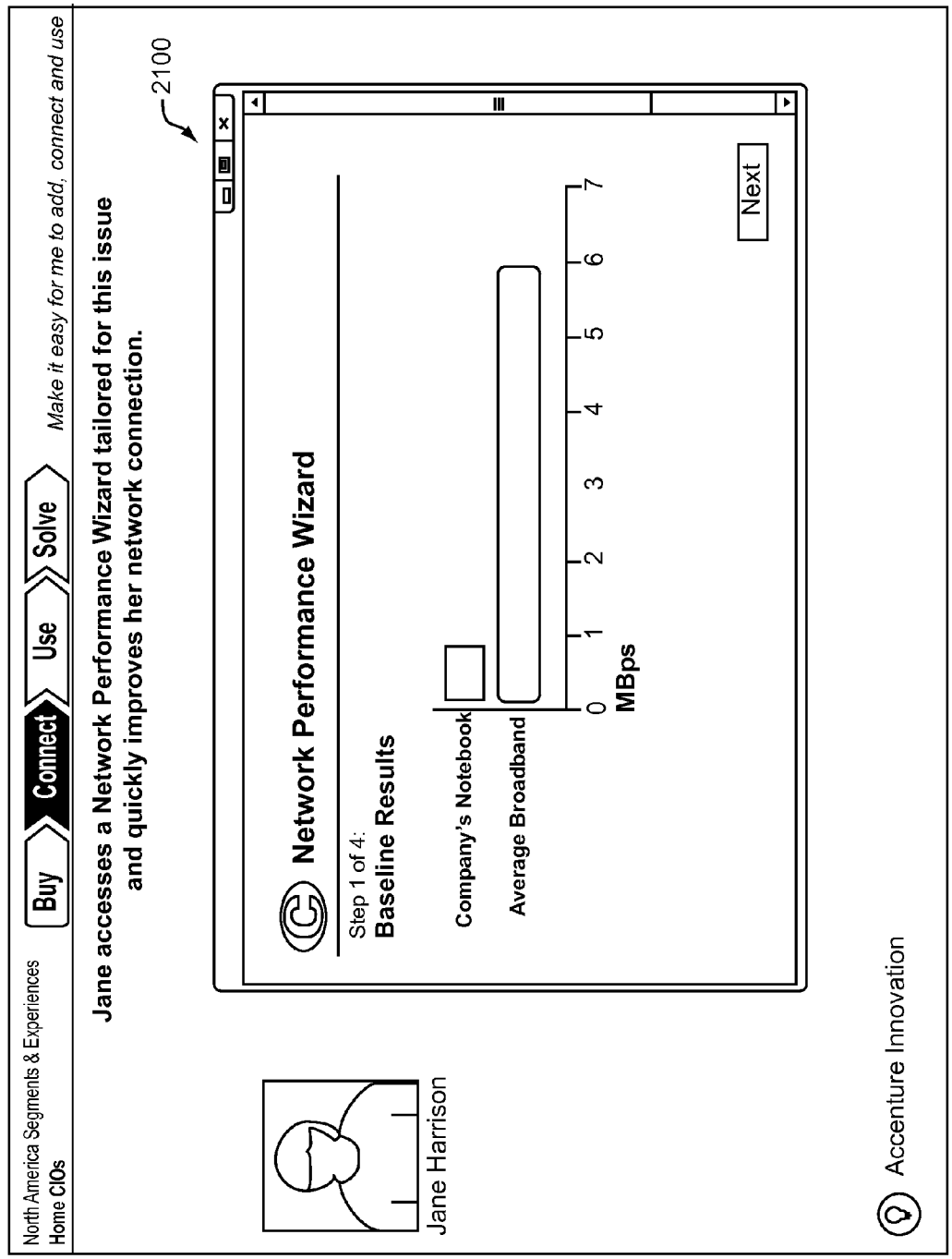
FIGS. 21-24 show one example of a network performance guide that assists the user in resolving the network connection error shown in FIG. 18.
Figure 22:
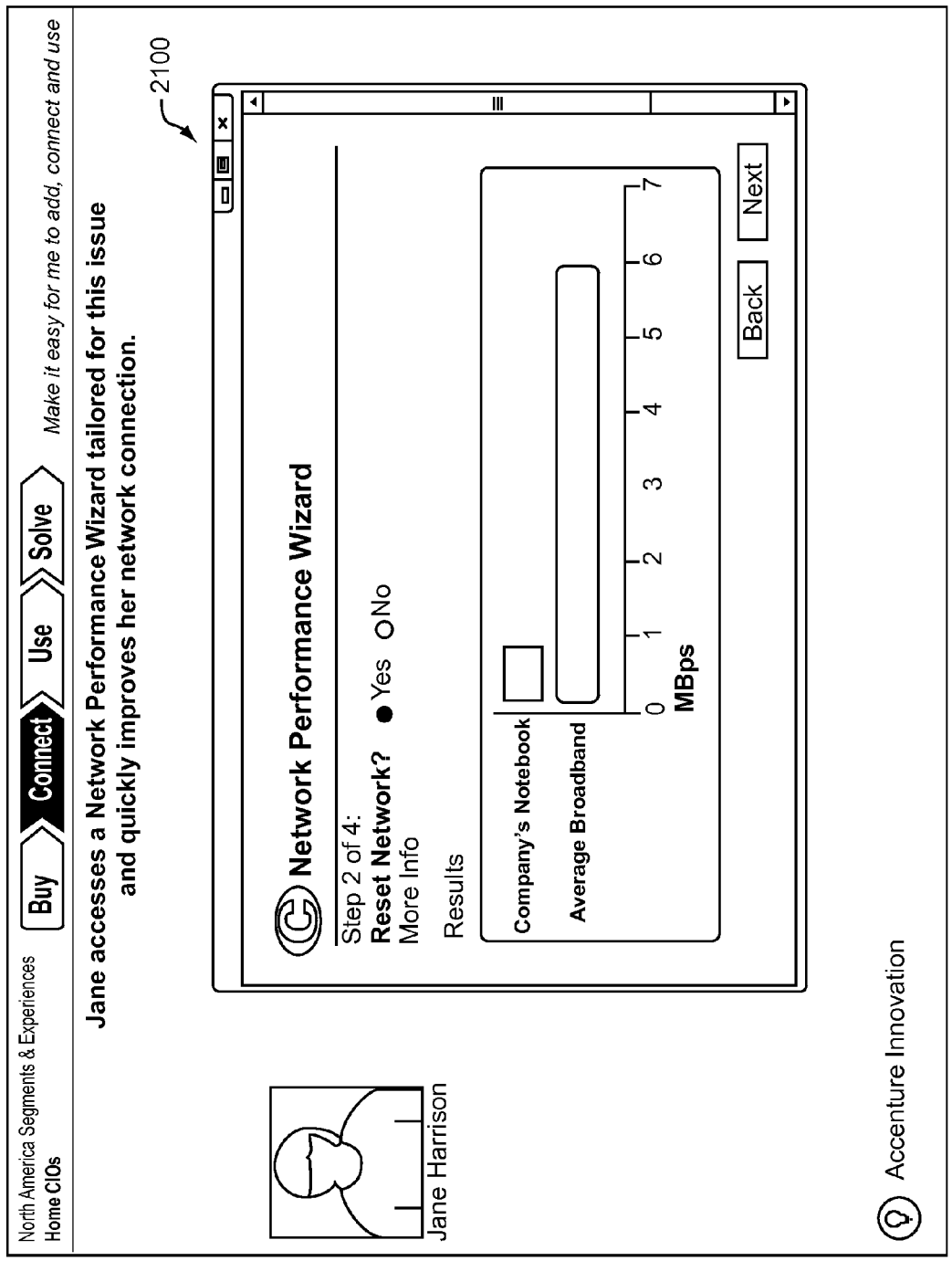
Figure 23:
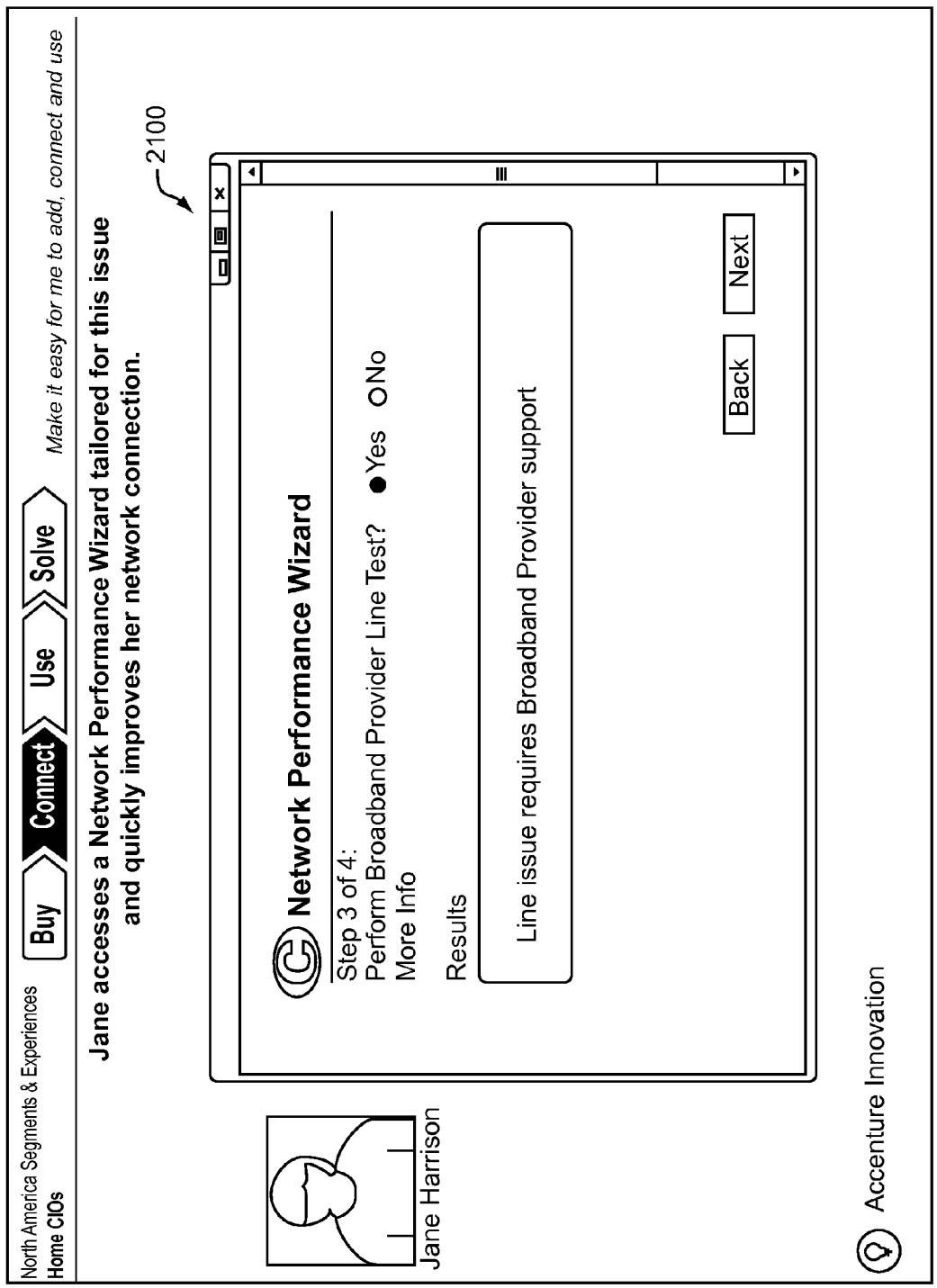
Figure 24:
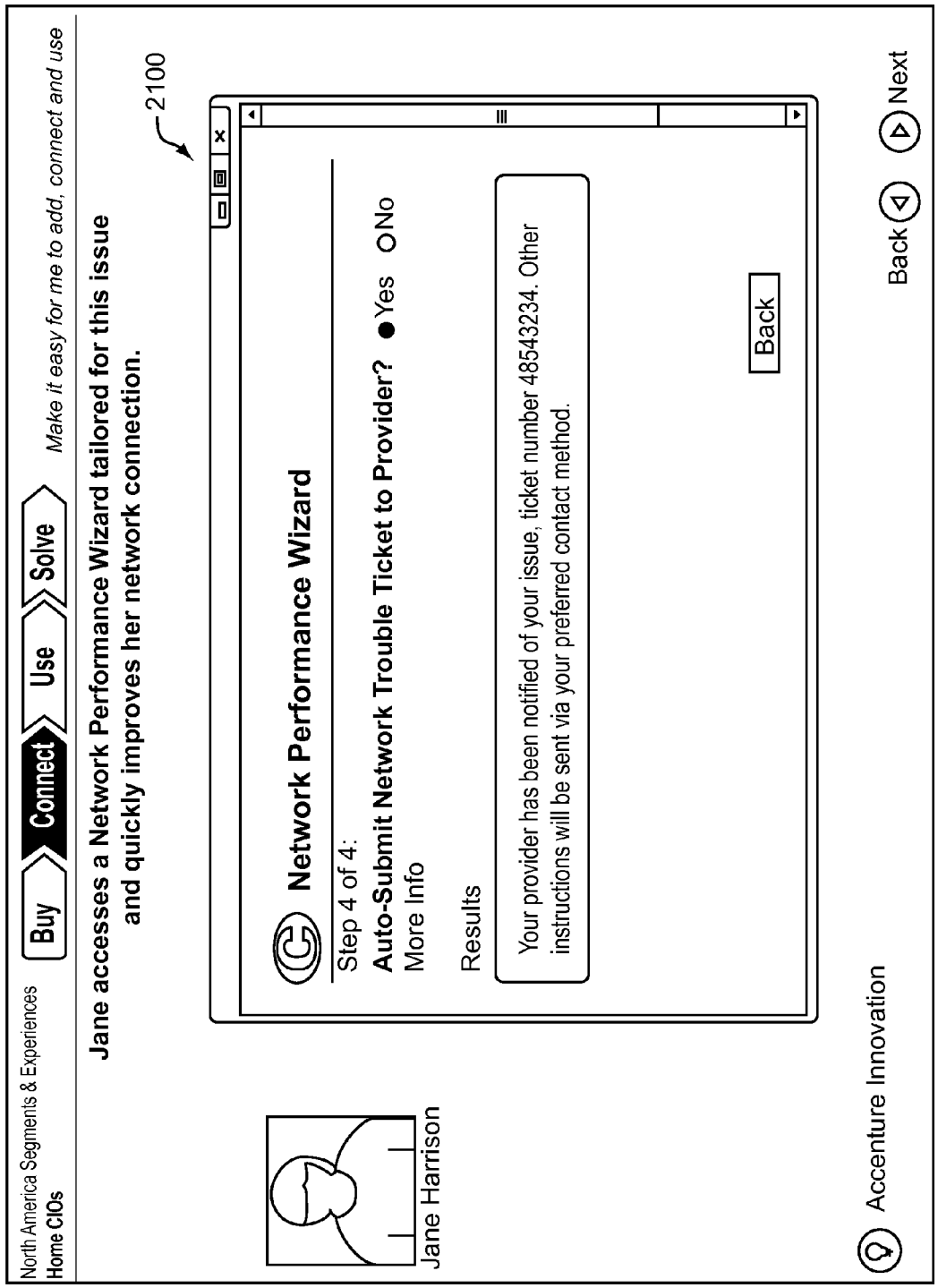

In response to this network error, Jane may undertake to repair the network connection and restore its nominal levels of throughput. FIGS. 21-24 show one example of a network performance guide 2100 that assists Jane in resolving the notebook computer's network connection error shown in FIG. 18. FIG. 21 shows that the network connection throughput of the notebook computer is operating below pre-defined levels of acceptable network throughput. FIG. 22 shows that network performance guide 2100 may include an option for Jane to reset the network connection of the notebook computer. FIG. 23 shows that the network performance guide 2100 may include an option to perform a line test on the network connection of the notebook computer. FIG. 23 also shows that the network performance guide 2100 may include an informational display that informs Jane she should contact her broadband provider to perform the line test. FIG. 24 shows that the network performance guide 2100 may include an option to contact Jane's broadband provider automatically and that the network performance guide 2100 may automatically generate a case ticket number for her network connection issue.

In providing the information and details shown in FIGS. 21-24, the network performance guide 2100 may be in communication with one or more customer support system 106-120 of the digital footprint driven multi-channel integrated support system 102. For example, the network performance guide 2100 may communicate with the customer relationship management system 106, the resolution paths system 118, or any of the other customer support systems 106-120.

Jane's network connection issue illustrates that the digital footprint driven multi-channel integrated support system 102 provides several guided and tailored options for assisting a user in determine problems with their electronic components. The network connection error further illustrates that the digital footprint driven multi-channel integrated support system 102 may be configured to partner with a telecommunication or broadband provider to provide customized and informational customer support. The digital footprint driven multi-channel integrated support system 102 further provides industry-leading hardware, software and network problem solving methodologies.

Figure 25:
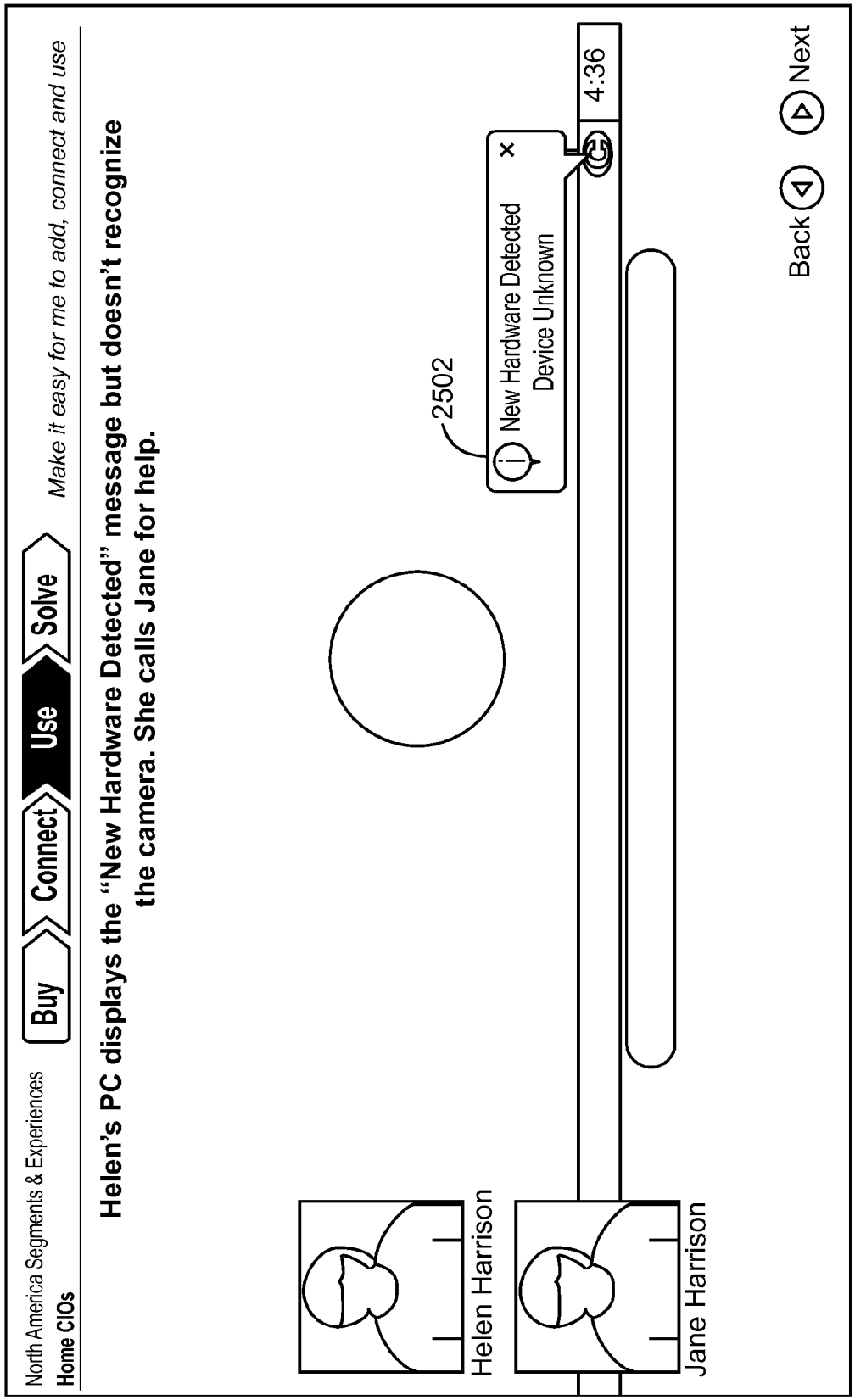
FIG. 25 shows one example of a new hardware detected notification that notifies a user that new hardware has been detected.

FIG. 25 introduces Jane's mother, Helen. Helen has recently purchased a digital camera and has connected the camera to her desktop computer. Helen's desktop computer may be configured with local software provided by her primary provider to inform her when a new electronic component is not functioning properly. FIG. 25 shows one example of a new hardware detected notification 2502 that notifies Helen that her new digital camera has been detected, but that the desktop computer does not recognize the make or model of the new digital camera. Helen decides to call her daughter, Jane, for help.

Figure 26:
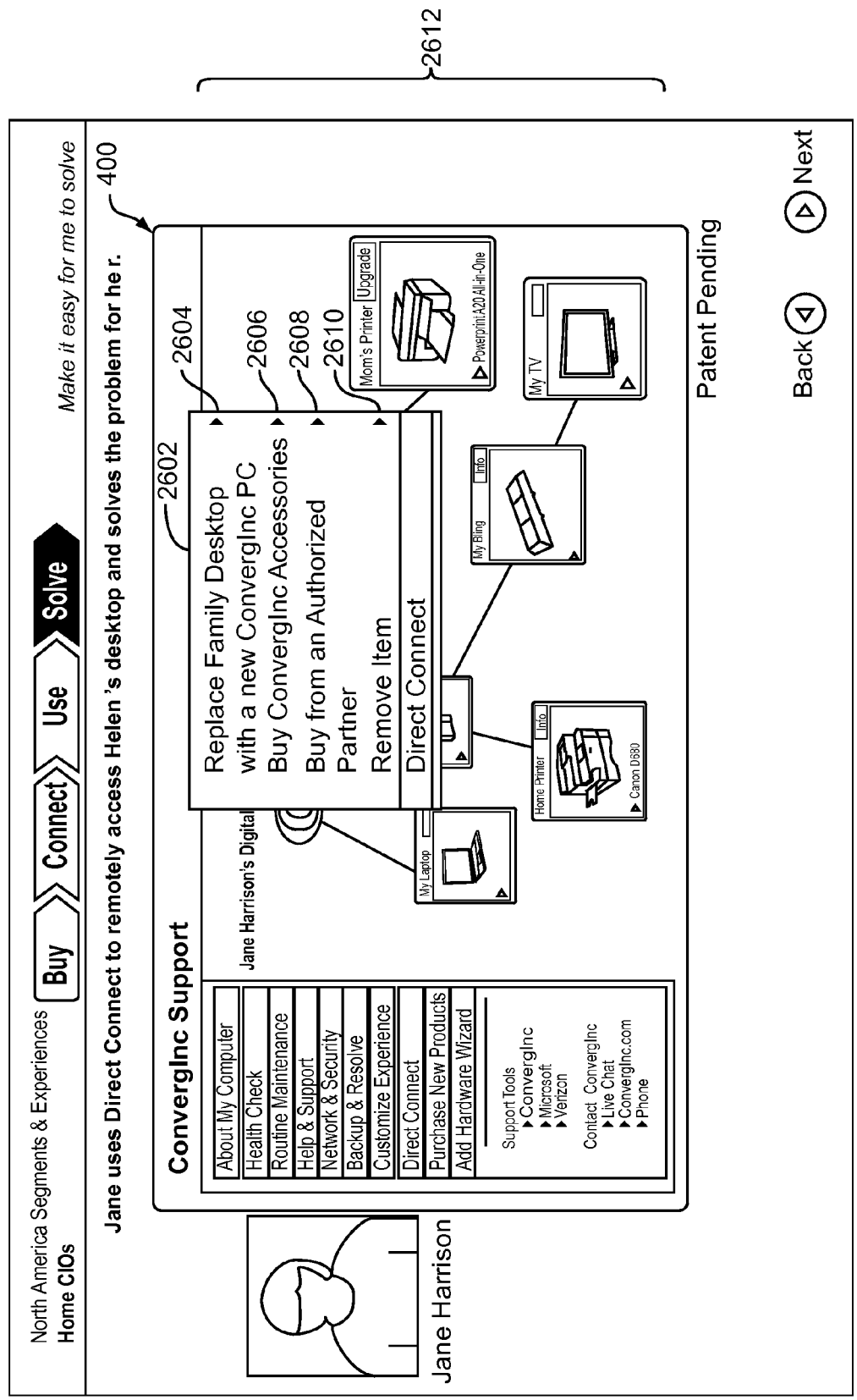
FIG. 26 shows one example of using the local digital footprint graphical user interface to directly connect to another electronic component.

Jane decides to connect to her mother's desktop computer to assist Helen in troubleshooting the problem with the digital camera. FIG. 26 shows that Jane may use the local digital footprint graphical user interface 400 to directly connect to her mother's electronic component system. The local digital footprint graphical user interface 400 displays Jane's local digital footprint 2612 and the electronic components connected in Jane's local digital footprint 2612. In addition, because Helen has a user profile associated with Jane's household profile, Helen's electronic components are also displayed as part of Jane's local digital footprint.

The local digital footprint graphical user interface 400 also displays a local digital footprint menu 2602 for selecting options 2604-2610 to perform on one or more electronic components in the local digital footprint 2612. In one implementation, the options 2604-2610 include a replace option 2604 to replace an electronic component, an accessory option 2606 to buy additional accessories for the electronic component, a partner option 2608 to buy electronic components or accessories from an authorized partner of the primary provider, and a direct connect option 2610 to directly connect the selected electronic component to another electronic component. In Jane's situation, Jane has chosen to directly connect to Helen's desktop computer using the direct connect option 2610.

Figure 27:
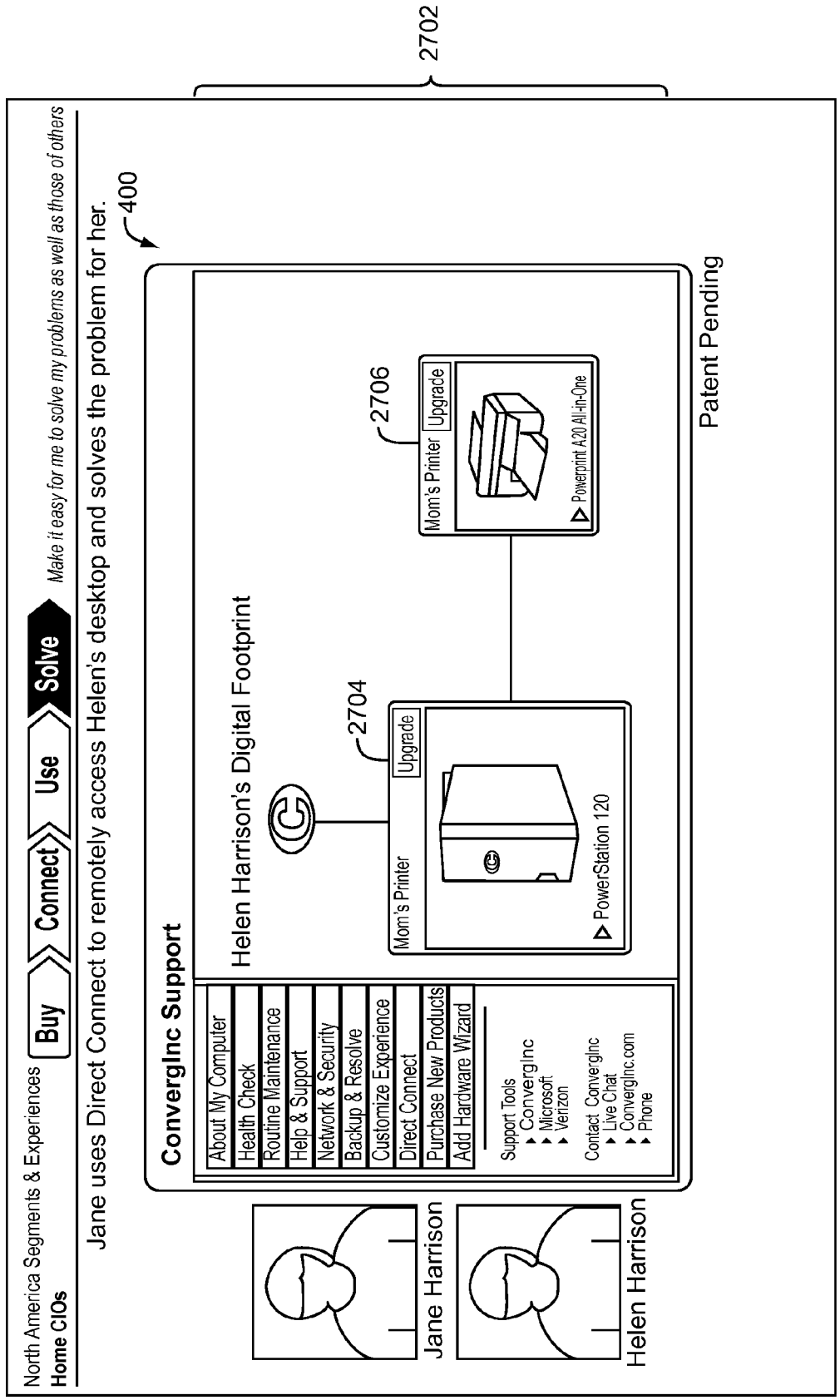
FIG. 27 shows one example of a local digital footprint graphical user interface that assists a user in remotely accessing electronic components.

After selecting to directly connect to Helen's desktop computer, the local digital footprint graphical user interface 400 displays Helen's digital footprint. FIG. 27 shows one example of the local digital footprint graphical user interface 400 that displays Helen's remote digital footprint 2702. As shown in FIG. 27, Helen's remote digital footprint 2702 includes a desktop computer 2704 and a printer 2706. Since the digital camera was not properly recognized by the local software on the desktop computer 2704 or by the digital footprint portal 104, the digital camera does not appear in Helen's remote digital footprint 2702.

Figure 28:
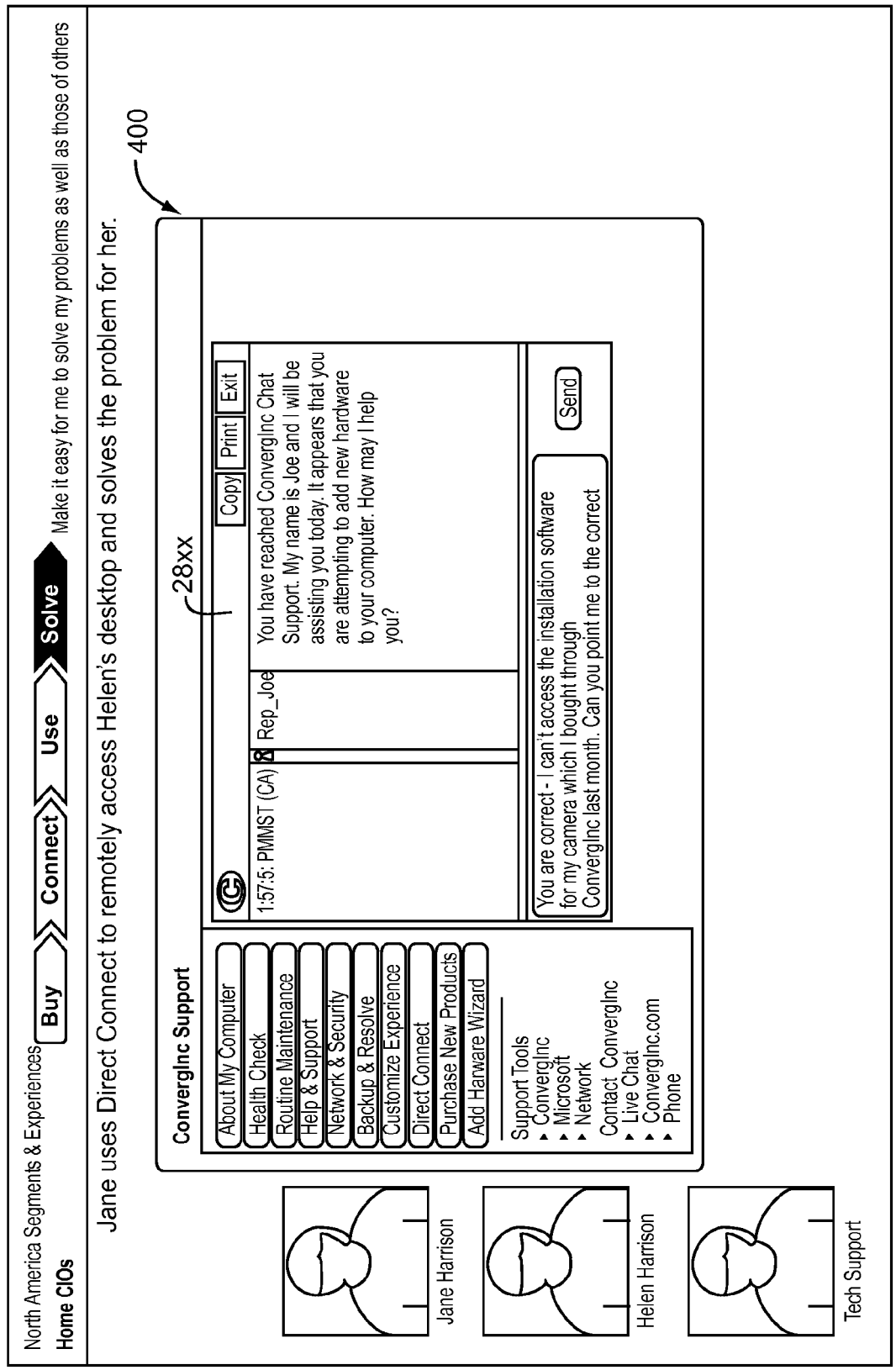
FIG. 28 shows one example of a local digital footprint graphical user interface that for interacting with the customer service technician.
Figure 29:
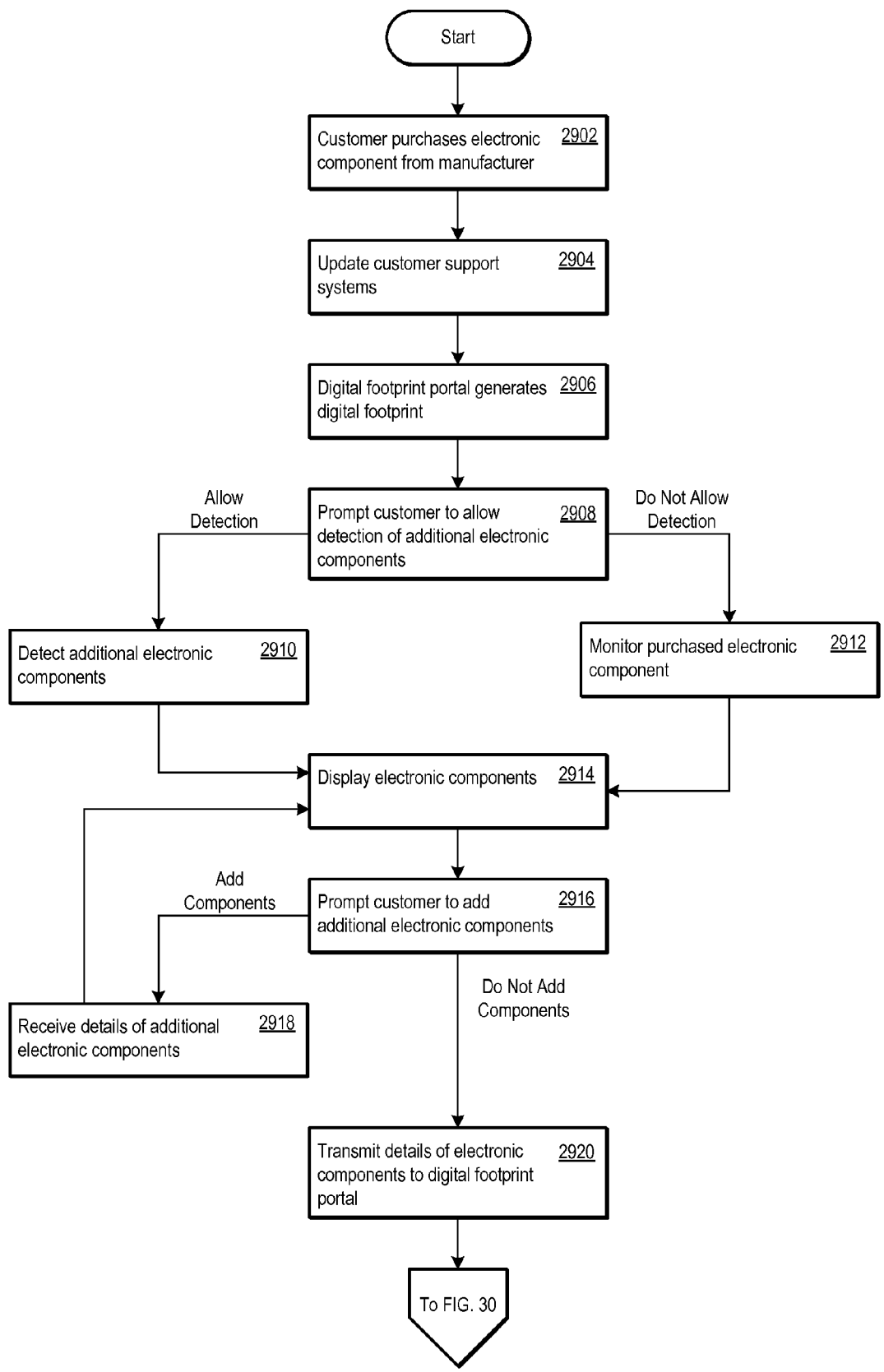
FIGS. 29-30 show one example of logic flow for integrating a new electronic component into a digital footprint.
Figure 30:
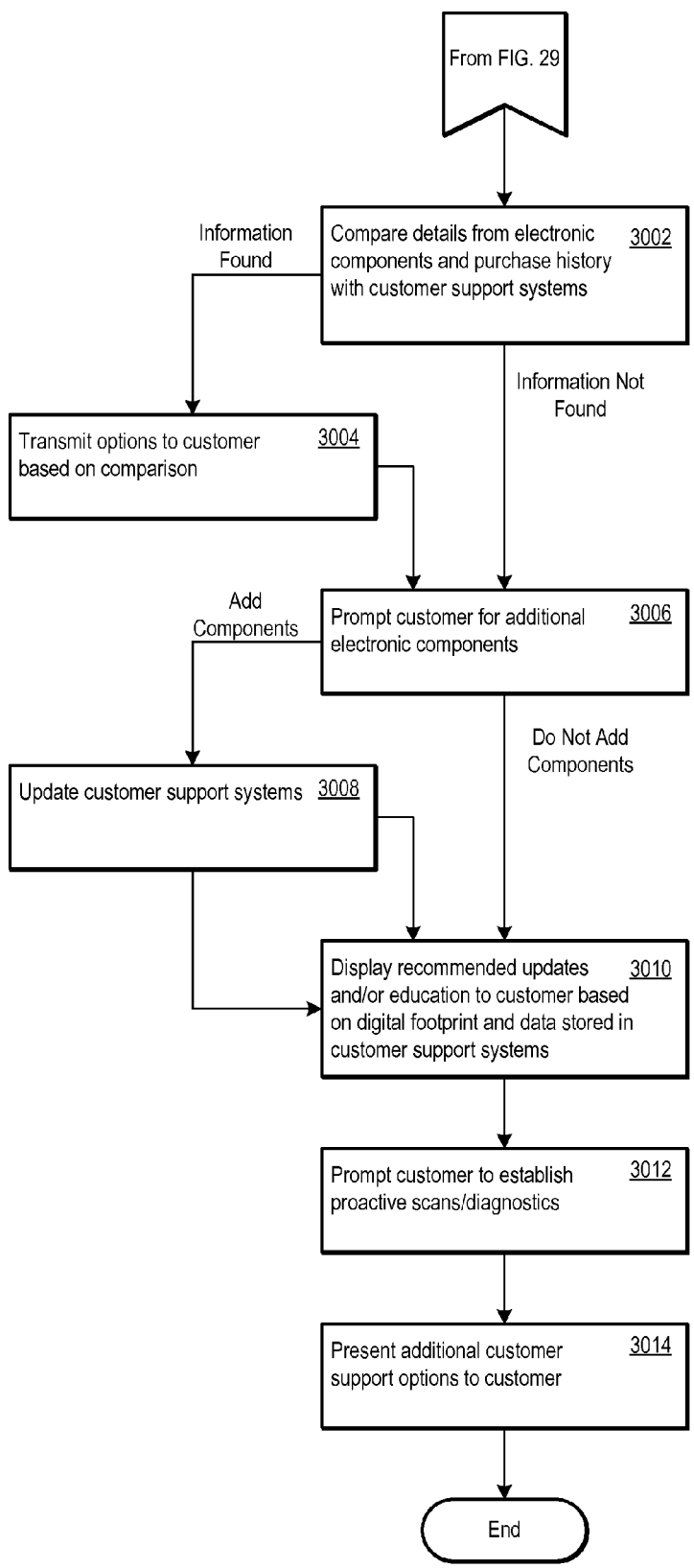

Jane decides to contact a customer support technician user the local digital footprint graphical user interface 400 to help her resolve her mother's digital camera issue. FIG. 28 shows one example of a local digital footprint graphical user interface 400 that for interacting with the customer service technician. The local digital footprint graphical user interface 400 displays a customer support chat window 2802 that Jane may use to converse and interact with a customer support technician to resolve the digital camera issue. Using the customer support chat window 2802, Jane explains the digital camera issue to the customer support technician. The customer support technician may then troubleshoot the digital camera issue using the knowledge sharing cockpit graphical user interface 1500 previously discussed with reference to FIG. 15. The customer support technician may use the knowledge sharing cockpit graphical user interface 1500 to identify where to download the right installation software for the digital camera and to help Jane resolve the digital camera issue.

One of the many features of the digital footprint driven multi-channel integrated support system 102 is that it assists a user in integrating new electronic components into an existing digital footprint. With reference to FIGS. 1-2, FIGS. 29-30 show one example of logic flow for integrating a new electronic component into a digital footprint. Initially, a customer purchases product(s)/service(s) from a manufacturer (2902). The digital footprint portal 104 updates the customer relationship management system 106 to create the customer profile, household profile, and purchase history information (2904). The creation of the customer profile, household profile, and purchase history information triggers the creation of the initial digital footprint (2906).

Upon initial use of the device, the customer is prompted to allow additional detection of attached peripherals and networked devices to aid in support (2908). If customer agrees, on-the-box software located on the desktop computer 130 initiates auto-detection of attached peripherals and networked devices (2910). If the customer does not agree, than only the manufacturer's purchased component (e.g., laptop/desktop) with attached peripherals is monitored (2912).

Once auto-detection complete, the user is presented with the findings (2914), and asked if they would like to manually add any additional devices or peripherals (2916). If the user wishes to add additional electronic components, a prompt is displayed that allows the user to add additional electronic components (2918). Once connected to the Internet, data is uploaded to the existing digital footprint stored on the digital footprint portal 104 (2920).

Data collected from auto-detection, as well as product/service purchase, is compared against the data stored by the customer support systems 106-120 (3002). The comparison may include analyzing the software drivers/updates database 222, the issue diagnosis database 226, the warranty information database 218, the product/service details database 220, and the instructional database 228 for any updates or proactive education the customer could leverage. If any such information is found, the digital footprint portal 104 offers options to the customer (3004).

The customer is then prompted whether the customer would like to receive support for additional devices/peripherals from the manufacturer for an additional fee (3006). If the user accepts, the products/services purchased database 212, the warranty information database 218, and the component attributes database 214 are updated (3008), and the digital footprint reflects those additional items as covered under warranty.

The customer then conducts recommended updates/education through "wizard like" steps via the digital footprint portal 104 (3010). Afterwards, the customer is prompted to setup proactive scans/diagnostics in either automated or manual fashion (3012). Finally, the customer is presented with additional options, to be used at any point in time, to access additional educational instructions, to determine and purchase recommended replacement or add-on parts, or to download additional software drivers and updates (3014).

Figure 31:
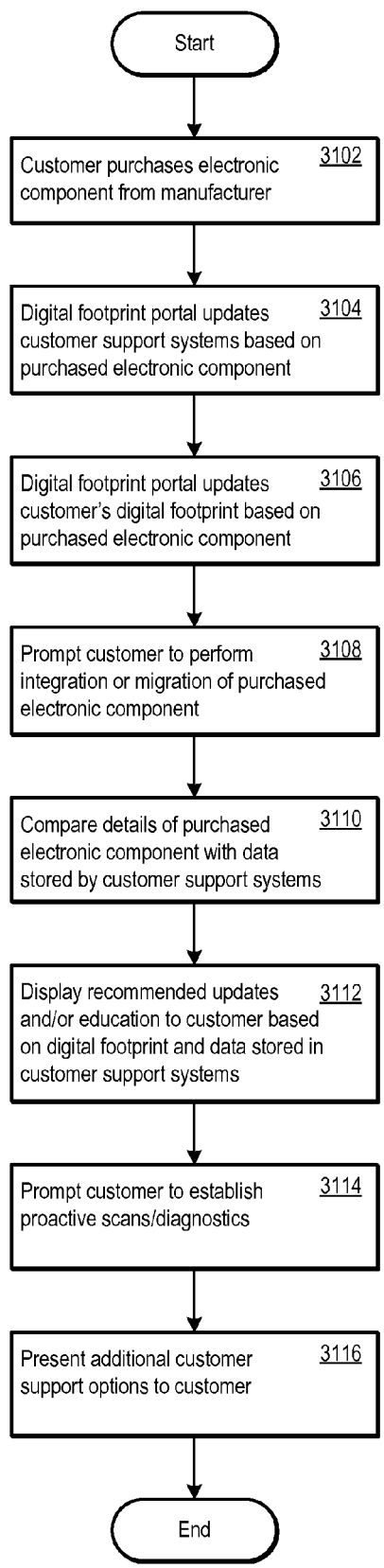
FIG. 31 shows one example of logic flow for migrating data from a currently owned electronic component to a newly purchased electronic component.

FIG. 31 shows one example of logic flow for migrating data from a currently owned electronic component to a newly purchased electronic component. Initially, a customer purchases product(s)/service(s) from a manufacturer (3102). The digital footprint portal 104 updates the customer relationship management system 106 to create the customer profile, household profile, and purchase history information (3104). The creation of the customer profile, household profile, and purchase history information triggers the creation of the initial digital footprint (3106).

The customer is then prompted whether the data from one of their existing digital footprint electronic components should be transferred to the purchased electronic component (3108). If customer indicates yes, customer is walked through "wizard like" process to determine which files and settings from the existing product should be transferred.

Upon initial use of the purchased electronic component, the details of the electronic component are compared against the data stored by the customer support systems 106-120 (3110). The comparison may include analyzing the software drivers/updates database 222, the issue diagnosis database 226, the warranty information database 218, the product/service details database 220, and the instructional database 228 for any updates or proactive education the customer could leverage. If any such information is found, the digital footprint portal 104 offers options to the customer.

The customer then conducts recommended updates/education through "wizard like" steps via the digital footprint portal 104 (3112). Afterwards, the customer is prompted to setup proactive scans/diagnostics in either automated or manual fashion (3114). Finally, the customer is presented with additional options, to be used at any point in time, to access additional educational instructions, to determine and purchase recommended replacement or add-on parts, or to download additional software drivers and updates (3116).

Figure 32:
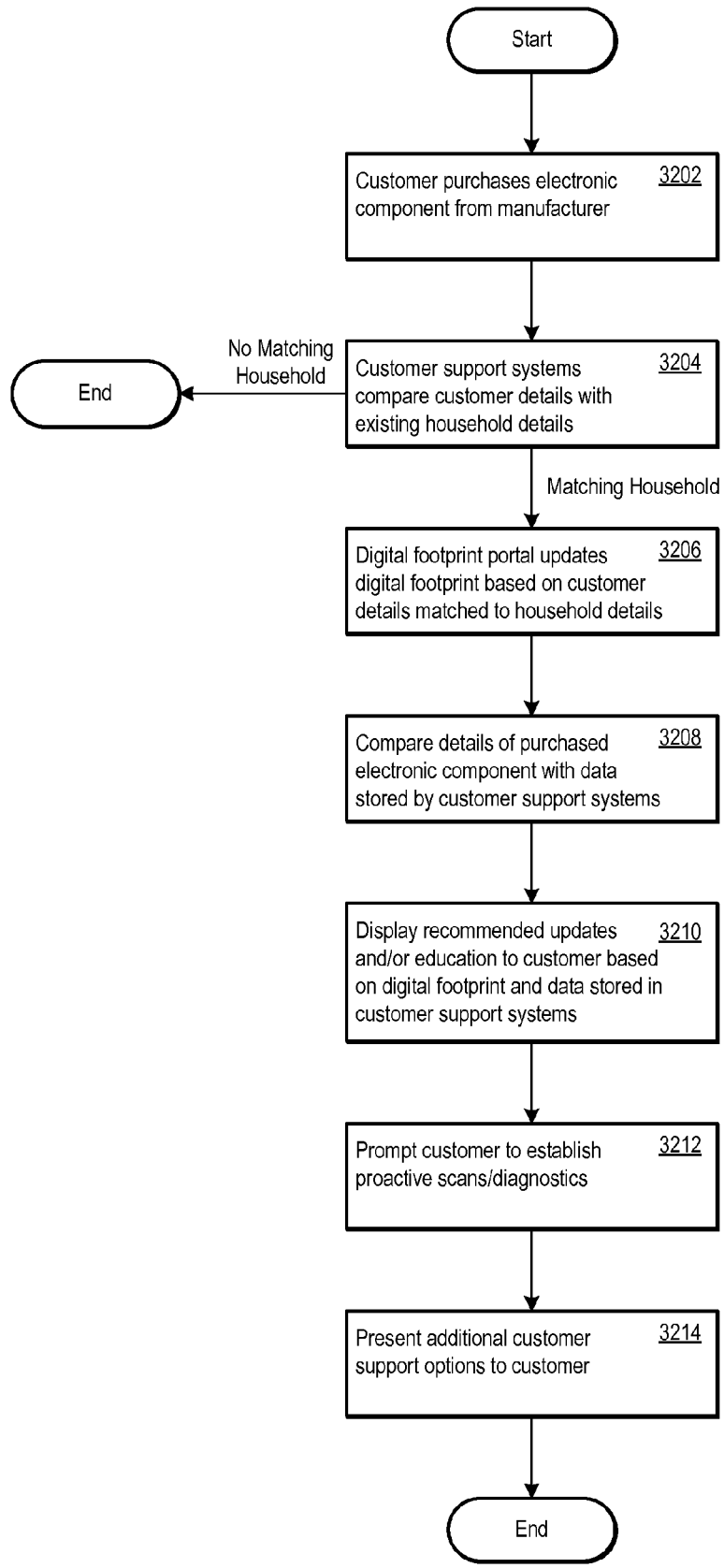
FIG. 32 shows one example of logic flow for integrating a customer profile into a household profile.

FIG. 32 shows one example of logic flow for integrating a customer profile into a household profile. Initially, a new customer purchases an electronic component or service (3202). The customer relationship management system 106 then associates the customer profile with a purchase history information. The customer relationship management system 106 may then compare the customer details of the customer profile with the household profiles stored in the household profile database 202. When the customer profile is matched to an existing household profile, an update to the existing digital footprint is triggered to add the additional household member and their electronic component/service (3206). Alternatively a customer can choose to manually add a household member and their electronic component or service to the existing household digital footprint.

Upon initial use of the purchased electronic component, the details of the electronic component are compared against the data stored by the customer support systems 106-120 (3208). The comparison may include analyzing the software drivers/updates database 222, the issue diagnosis database 226, the warranty information database 218, the product/service details database 220, and the instructional database 228 for any updates or proactive education the customer could leverage. If any such information is found, the digital footprint portal 104 offers options to the customer.

The customer then conducts recommended updates/education through "wizard like" steps via the digital footprint portal 104 (3210). Afterwards, the customer is prompted to setup proactive scans/diagnostics in either automated or manual fashion (3212). Finally, the customer is presented with additional options, to be used at any point in time, to access additional educational instructions, to determine and purchase recommended replacement or add-on parts, or to download additional software drivers and updates (3214).

Figure 33:
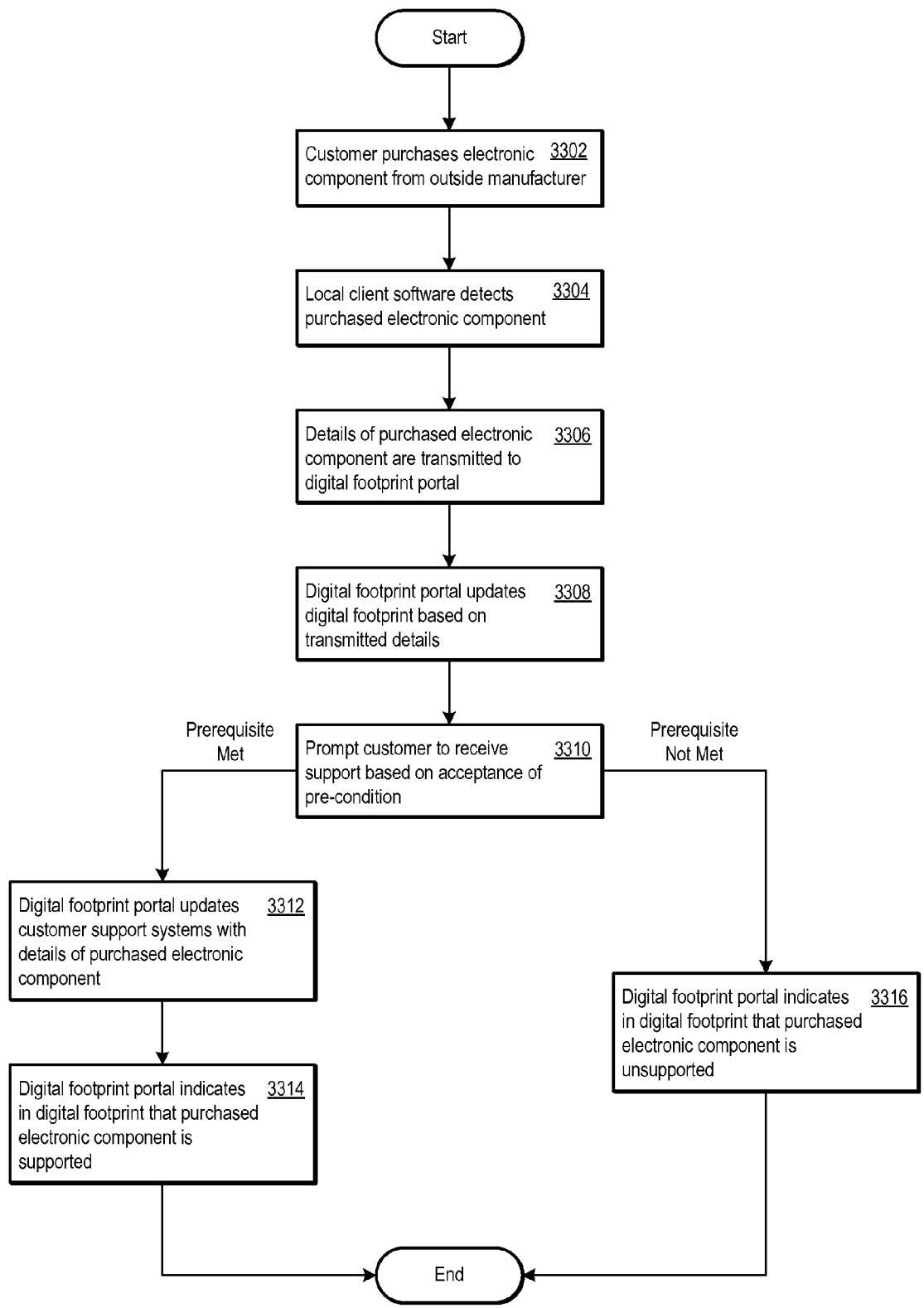
FIG. 33 shows one example of logic flow for detecting an unsupported electronic component for an existing user.

FIG. 33 shows one example of logic flow for detecting an unsupported electronic component for an existing user. Initially, the customer purchases the electronic component product from an outside manufacturer (3302).

Upon initial installation/use of the device, a local software client detects the purchased electronic component through auto-detection (3304) and the user is presented with the findings, and asked if they would like to manually add any additional devices or peripherals. The local software client may be stored on the digital footprint portal 104, a desktop computer, a Flash memory drive, or on any other type of media or system. The details of the purchased electronic component are transmitted to the digital footprint portal 104 (3306), and the digital footprint portal 104 (3306) updates the digital footprint based on the transmitted details (3308).

The customer is then prompted whether they would like to receive support for additional product based on a satisfying a prerequisite, such as the payment of a fee (3310). If the customer accepts, the products/services purchased database 212, the warranty information database 218, and the component attributes database 214 are updated (3312), and the digital footprint is modified to reflect that the purchased electronic component is a supported electronic component (3314). If the customer does not satisfy the prerequisite, purchased electronic component is added to the digital footprint, but is marked as an unsupported electronic component (3316).

Figure 34:
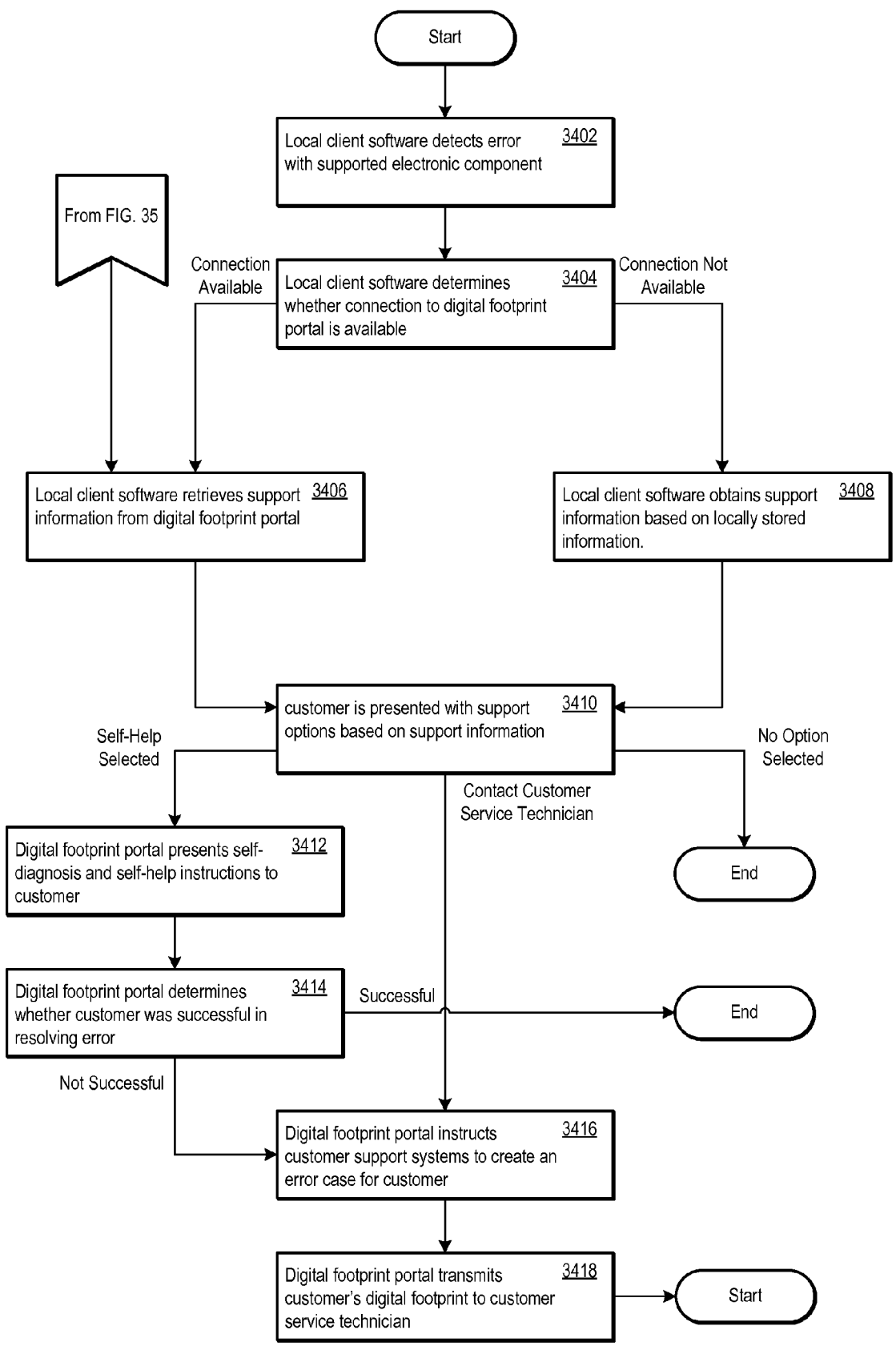
FIG. 34 shows one example of logic flow for detecting an error in a supported electronic component.

FIG. 34 shows one example of logic flow for detecting an error in a supported electronic component. Initially, a local software client detects an error condition a supported electronic component, such as a memory error, video driver problem, or other error (3402).

The local client software then determines whether a connection to the digital footprint portal 104 is available (3404). If a connection to the digital footprint portal 104 is available, the local client software connects to the digital footprint portal 104 for information from the issue diagnosis database 226 based on warranty information from the warranty database 218 (3406). If the local software client determines that a connection to the digital footprint portal 104 is not available, the local client software leverages locally stored issue diagnosis information and resolution path information to direct the customer to best support (i.e., connect to the internet, call) based on the warranty purchased (3408).

The customer is then presented with support options based on information from the customer experience rules engine 210, the warranty information database 218, and the customer profile database 206 (3410). The options may include a self-help option, a contact customer service technician option, or other options.

If the customer selects the self-help option, the digital footprint portal 104 walks the customer through a "wizard-like" process leveraging the customer support system 106-120 to address the error condition (3412). The digital footprint portal 104 then determines whether the customer was successful in resolving the error through the self-help option (3412). If the digital footprint portal 104 determines that the customer is not able to complete through the self-help option, or the customer would like to pursue a different support option, a case is created with the troubleshooting actions conducted to date and options for contacting support are presented based on the customer experience rules engine 210 (3416). These options could include phone, chat, email, off-line diagnostics, etc. . . .

Whether it be real time or off-line, when customer support resumes the troubleshooting process, the customer support technician is presented with the customer's digital footprint and has access to all supporting case and triage information for diagnosis significantly reducing time to troubleshoot and resolve (3418). If the electronic component is accessible, and with the customer's approval, the technician can leverage the local client software to push updates and perform modifications to the electronic component.

Figure 35:
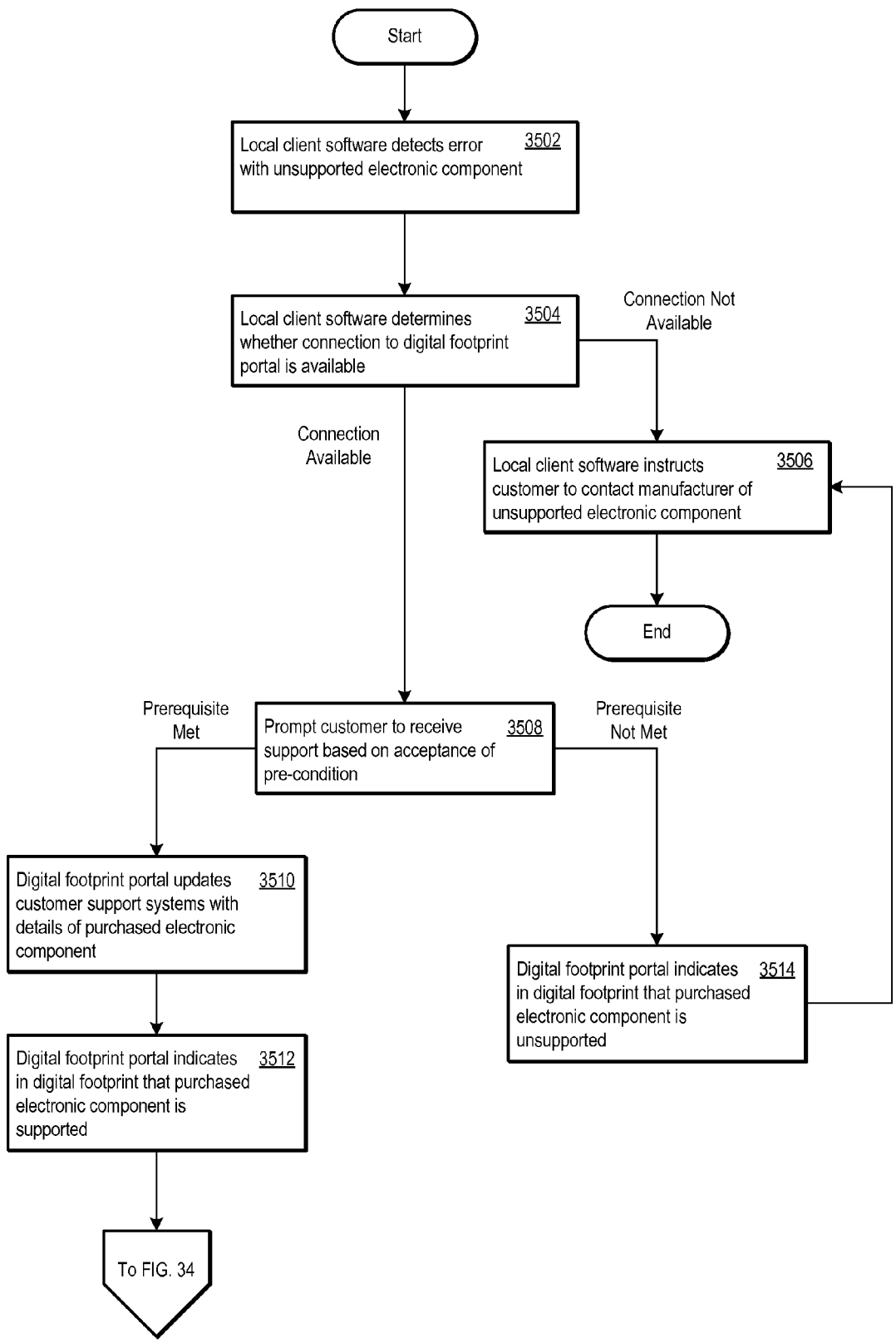
FIG. 35 shows one example of logic flow for detecting an error in an unsupported electronic component.

FIG. 35 shows one example of logic flow for detecting an error in an unsupported electronic component. Initially, local client software detects an error condition detected with a non-supported device, such as a video camera not capturing image (3502). The local client software then determines whether a connection is available to the digital footprint portal 104 (3504).

If a connection to the digital footprint portal 104 is available, the local client software prompts the customer whether they would like to receive support for additional product from a manufacturer based on satisfying an initial prerequisite, such as paying an additional fee for support (3508). If the customer accepts to satisfy the initial prerequisite, the products/services purchased database 212, the warranty information database 218, and the component attributes database 214 are updated (3510), and the digital footprint portal 104 reflects the electronic component as covered under warranty (3512). The logic flow then continues on as described as in FIG. 34, where the local client software retrieves support information from digital footprint portal 104 (3406).

If the customer declines to satisfy the initial prerequisite, the digital footprint portal 104 updates the digital footprint to reflect that the electronic component is unsupported (3514). The local client software then informs the customer to contact the manufacturer of the unsupported electronic component for support (3506).

Figure 36:
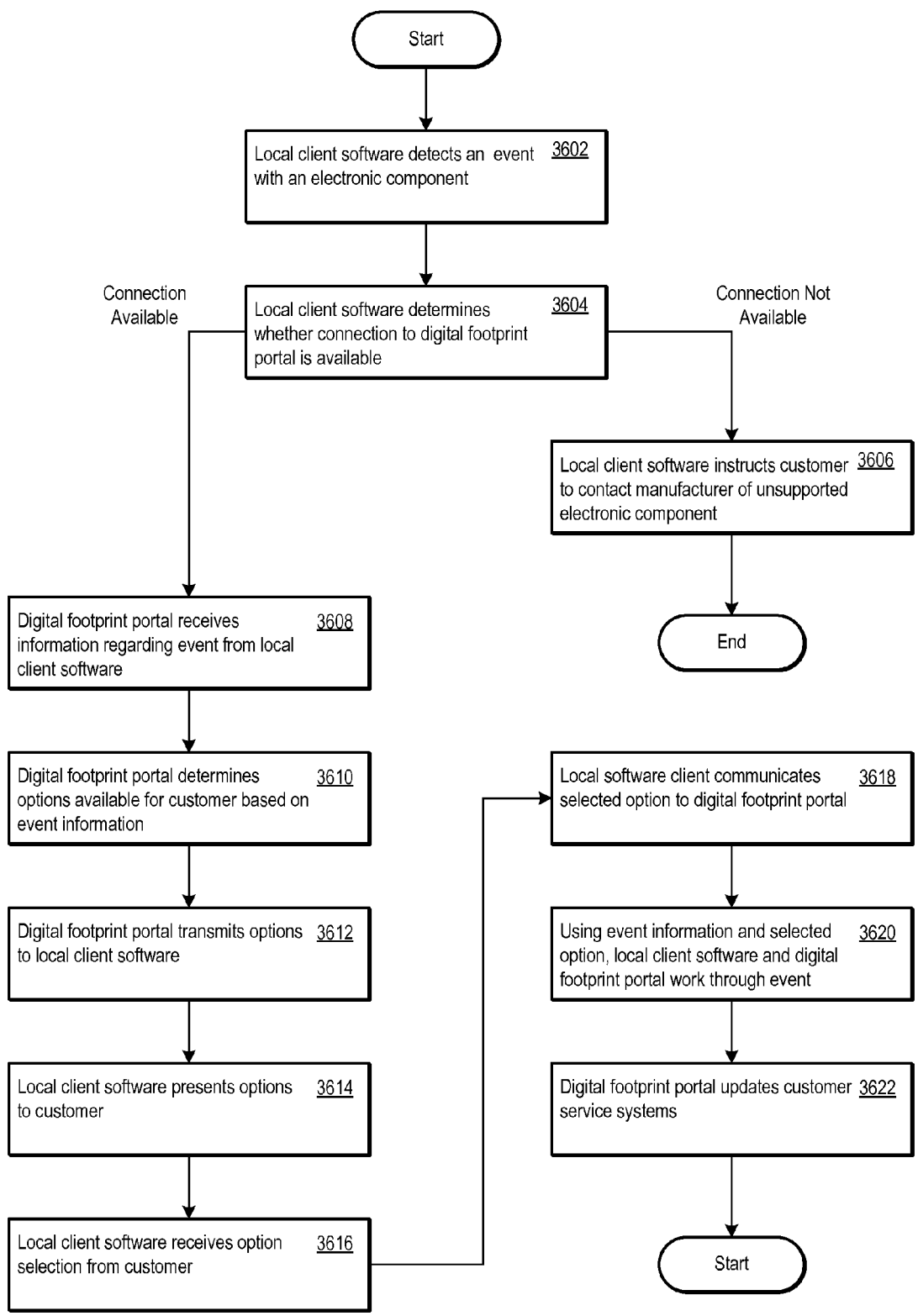
FIG. 36 shows one example of logic flow for event proactive notification.

FIG. 36 shows one example of logic flow for event proactive notification. Initially, local client software detects an event with an electronic component (3602). Examples of events include a warranty about to expire, known driver conflict for hardware/software, conflicting software packages, and other events. The local client software determines whether connection to digital footprint portal 104 is available (3604). If a connection to the digital footprint portal 104 is not available, the local client software instructs the customer to contact manufacturer of unsupported electronic component (3606).

However, if a connection to the digital footprint portal 104 is available, the local client software transmits event information to the digital footprint portal 104 (3608). The digital footprint portal 104 then determines the available options for the customer based on the event information (3610). The digital footprint portal may transmit the options to the local client software for display to the customer (3612). The local client software then prompts customer about the event and offers the options determined by the digital footprint portal 104 for how customer would like to proceed (3614). After the local client software receives the selected option from the customer (3616), the local client software transmits the selected option to the digital footprint portal 104 (3618). Using the event information and the selected option, the local client software, the digital footprint portal 104, and the customer work through event (3620). As the local client software, the digital footprint portal 104, and the customer work through the event, the digital footprint portal 104 updates the customer service systems 106-120 as appropriate (3622).

We claim:

1. A multi-channel integrated support method comprising:
creating a digital footprint specifying an electronic device configuration in place at a localized entity;
storing the digital footprint in a memory coupled to a processor;
rendering, using a migration graphical user interface connected to the memory, a footprint display comprising device representations of electronic devices present in the digital footprint;
obtaining, through the migration graphical user interface, an existing device selection specifying an existing device from the footprint display;
obtaining, through the migration graphical user interface, a new device selection specifying a new device to be added to the digital footprint;
obtaining legacy data migration instructions for migrating legacy data on the existing device to the new device;
displaying, through the migration graphical user interface, the legacy data migration instructions;
integrating the new device into the digital footprint; and
updating, through the migration graphical user interface, the footprint display to include the new device, wherein the migration graphical user interface comprises:
a complete migration control panel that controls migration of all data from the existing device;
a partial migration control panel that controls migration of a selected set of data from the existing device;
a declined migration control panel that prevents migration of any data from the existing device or another device from the footprint, or any combination thereof.

2. The method of claim 1, further comprising:
creating the digital footprint by analyzing purchase data or warranty data or both for creating the digital footprint.

3. The method of claim 1, further comprising:
initiating transfer of the legacy data to a third party device supplier for the new device.

4. The method of claim 1, where obtaining legacy data migration instructions comprises:
obtaining email migration instructions, video migration instructions, image migration instructions, driver migration instructions, or any combination thereof.

5. The method of claim 1, where the new device selection specifying the new device occurs when a purchase of the new device is detected.

6. The method of claim 1, further comprising:
obtaining the legacy data migration instructions by querying a customer support system for information relating to migrating the legacy data on the existing device to the new device.

7. The method of claim 6, further comprising:
creating the digital footprint by analyzing support options based on the information received from the customer support system.

8. A multi-channel integrated support system comprising:
a memory coupled to a processor, the memory comprising:
a digital footprint that specifies an electronic device configuration in place at a localized entity;
a migration graphical user interface that visualizes the digital footprint and is controlled by the processor to:
render a footprint display comprising device representations of electronic devices present in the digital footprint;
obtain an existing device selection specifying an existing device from the footprint display;
obtain a new device selection specifying a new device to be added to the digital footprint;
obtain legacy data migration instructions for migrating legacy data on the existing device to the new device;
display the legacy data migration instructions;
integrate the new device into the digital footprint; and
update the footprint display to include the new device:
wherein the migration graphical user interface comprises:
a complete migration control panel that controls migration of all data from the existing device;
a partial migration control panel that controls migration of a selected set of data from the existing device;
a declined migration control panel that prevents migration of any data from the existing device or another device from the footprint, or any combination thereof.

9. The system of claim 8, further comprising instructions stored in the memory that when executed by the processor:
creates the digital footprint by analyzing purchase data or warranty data or both for creating the digital footprint, where the purchase data and the warranty data are stored in the memory.

10. The system of claim 8, further comprising instructions stored in the memory that when executed by the processor:
initiate transfer of the legacy data to a third party device supplier for the new device.

11. The system of claim 8, the migration graphical user interface further configured to obtain email migration instructions, video migration instructions, image migration instructions, driver migration instructions, or any combination thereof.

12. The system of claim 8, where the migration graphical user interface is further configured to obtain the new device selection when a purchase of the new device is detected.

13. The system of claim 8, where the migration graphical user interface is further configured to obtain the legacy data migration instructions by querying a customer support system for information relating to migrating the legacy data on the existing device to the new device.

14. The system of claim 13, where the migration graphical user interface is further configured to create the digital footprint by analyzing support options based on the information obtain from the customer support system.

15. A multi-channel integrated support product comprising:
    a machine-readable medium; and
    instructions stored on the machine-readable medium that when executed by a processor cause the processor to:
        create a digital footprint specifying an electronic device configuration in place at a localized entity;
        store the digital footprint in a memory;
        render, through a migration graphical user interface, a footprint display comprising device representations of electronic devices present in the digital footprint;
        obtain, through the migration graphical user interface, an existing device selection specifying an existing device from the footprint display;
        obtain, through the migration graphical user interface, a new device selection specifying a new device to be added to the digital footprint;
        obtain legacy data migration instructions for migrating legacy data on the existing device to the new device;
        display, through the migration graphical user interface, the legacy data migration instructions;
        integrate the new device into the digital footprint; and
        update, through the migration graphical user interface, the footprint display to include the new device, wherein the migration graphical user interface comprises:
            a complete migration control panel that controls migration of all data from the existing device;
            a partial migration control panel that controls migration of a selected set of data from the existing device;
            a declined migration control panel that prevents migration of any data from the existing device or another device from the footprint, or any combination thereof.

16. The product of claim 15, wherein the instructions that when executed by the processor further cause the processor to:
    create the digital footprint by analyzing purchase data or warranty data or both for creating the digital footprint, where the purchase data and the warranty data are stored in the memory or on the machine-readable medium or both.

17. The product of claim 15, wherein the instructions that when executed by the processor further cause the processor to:
    initiate transfer of the legacy data to a third party device supplier for the new device.

18. The product of claim 15, wherein the instructions that when executed by the processor further cause the processor to:
    obtain email migration instructions, video migration instructions, image migration instructions, driver migration instructions, or any combination thereof.

19. The product of claim 15, wherein the instructions that when executed by the processor further cause the processor to:
    obtain the new device selection when a purchase of the new device is detected.

20. The product of claim 15, wherein the instructions that when executed by the processor further cause the processor to:
    obtain the legacy data migration instructions by querying a customer support system for information relating to migrating the legacy data on the existing device to the new device.

21. The product of claim 20, wherein the instructions that when executed by the processor further cause the processor to:
    create the digital footprint by analyzing support options based on the information received from the customer support system.

22. A multi-channel integrated support product comprising:
    a machine-readable medium; and
    instructions stored on the machine-readable medium that when executed by a processor cause the processor to:
        create a digital footprint specifying an electronic device configuration in place at a localized entity;
        store the digital footprint in a memory;
        render, through a migration graphical user interface, a footprint display comprising device representations of electronic devices present in the digital footprint;
        obtain, through the migration graphical user interface, an existing device selection specifying an existing device from the footprint display;
        obtain, through the migration graphical user interface, a new device selection specifying a new device to be added to the digital footprint;
        obtain legacy data migration instructions for migrating legacy data on the existing device to the new device;
        display, through the migration graphical user interface, the legacy data migration instructions;
        integrate the new device into the digital footprint; and
        update, through the migration graphical user interface, the footprint display to include the new device, where:
        the instructions cause the processor to create the digital footprint by analyzing purchase data or warranty data or both, stored in the memory or on the machine-readable medium or both.

23. The product of claim 22, where the instructions further cause the processor to:
    initiate transfer of the legacy data to a third party device supplier for the new device.

24. The product of claim 22, where the instructions further cause the processor to:
    obtain email migration instructions, video migration instructions, image migration instructions, driver migration instructions, or any combination thereof.

25. The product of claim 22, where the instructions further cause the processor to:
    create the digital footprint by analyzing support options based on information received from a customer support system.

26. The product of claim 22, where the instructions further cause the processor to:
    obtain the new device selection when a purchase of the new device is detected.

27. The product of claim 22, where the instructions further cause the processor to:
    obtain the legacy data migration instructions by querying a customer support system for information relating to migrating the legacy data on the existing device to the new device.

28. A multi-channel integrated support product comprising:
  a machine-readable medium; and
  instructions stored on the machine-readable medium that when executed by a processor cause the processor to:
    create a digital footprint specifying an electronic device configuration in place at a localized entity;
    store the digital footprint in a memory;
    render, through a migration graphical user interface, a footprint display comprising device representations of electronic devices present in the digital footprint;
    obtain, through the migration graphical user interface, an existing device selection specifying an existing device from the footprint display;
    obtain, through the migration graphical user interface, a new device selection specifying a new device to be added to the digital footprint;
    obtain legacy data migration instructions for migrating legacy data on the existing device to the new device;
    display, through the migration graphical user interface, the legacy data migration instructions;
    integrate the new device into the digital footprint; and
    update, through the migration graphical user interface, the footprint display to include the new device, where:
  the instructions cause the processor to obtain the new device selection when a purchase of the new device is detected.

29. The product of claim 28, where the instructions further cause the processor to:
  initiate transfer of the legacy data to a third party device supplier for the new device.

30. The product of claim 28, where the instructions further cause the processor to:
  obtain email migration instructions, video migration instructions, image migration instructions, driver migration instructions, or any combination thereof.

31. The product of claim 28, where the instructions further cause the processor to:
  create the digital footprint by analyzing support options based on information received from a customer support system.

32. The product of claim 28, where the instructions further cause the processor to:
  obtain the legacy data migration instructions by querying a customer support system for information relating to migrating the legacy data on the existing device to the new device.

33. A multi-channel integrated support product comprising:
  a machine-readable medium; and
  instructions stored on the machine-readable medium that when executed by a processor cause the processor to:
    create a digital footprint specifying an electronic device configuration in place at a localized entity;
    store the digital footprint in a memory;
    render, through a migration graphical user interface, a footprint display comprising device representations of electronic devices present in the digital footprint;
    obtain, through the migration graphical user interface, an existing device selection specifying an existing device from the footprint display;
    obtain, through the migration graphical user interface, a new device selection specifying a new device to be added to the digital footprint;
    obtain legacy data migration instructions for migrating legacy data on the existing device to the new device;
    display, through the migration graphical user interface, the legacy data migration instructions;
    integrate the new device into the digital footprint; and
    update, through the migration graphical user interface, the footprint display to include the new device, where:
  the instructions cause the processor to obtain the legacy data migration instructions by querying a customer support system for information relating to migrating the legacy data on the existing device to the new device.

34. The product of claim 33, where the instructions further cause the processor to:
  initiate transfer of the legacy data to a third party device supplier for the new device.

35. The product of claim 33, where the instructions further cause the processor to:
  obtain email migration instructions, video migration instructions, image migration instructions, driver migration instructions, or any combination thereof.

36. The product of claim 33, where the instructions further cause the processor to:
  create the digital footprint by analyzing support options based on information received from a customer support system.

* * * * *

UNITED STATES PATENT AND TRADEMARK OFFICE
CERTIFICATE OF CORRECTION

PATENT NO. : 8,060,418 B2  Page 1 of 3
APPLICATION NO. : 12/397214
DATED : November 15, 2011
INVENTOR(S) : Robert W. Honts et al.

It is certified that error appears in the above-identified patent and that said Letters Patent is hereby corrected as shown below:

In the drawings: in Figure 3, third column, after line 3, under "Householder Segment Values", after "Multiple profiles on same machine" insert --. . .--.

In the drawings: in Figure 3, first column, line 2, under "Scenario Walkthrough" replace "School' catalog," with --School" catalog,--.

In the drawings: in Figure 10, in the line which begins with "Emily wants to learn" after "basics, and" replace "Converginc" with --ConvergInc--.

In the drawings: in Figure 11, in the line which begins with "Emily receives and views" after "video editing" replace "bascis" with --basics--.

In the drawings: in Figure 11, under the heading "Overview", second paragraph, third line, after "track of the timeline," replace "andA/B" with --and A/B--.

In the drawings: in Figure 21, in the graphic line 0 - 7, above "MBps" replace "3" with -- $\overset{|}{3}$ --.

In the drawings: in Figure 22, in the graphic line 0 - 7, above "MBps" replace "3" with -- $\overset{|}{3}$ --.

In the drawings: in Figure 28, left column, under "ConvergInc Support", in the 10th text bubble, replace "Add Harware" with --Add Hardware--.

In the drawings: in Figure 34, in box 3410, before "is presented with support" replace "customer" with --Customer--.

In column 1, line 52, before "daunting task in" insert --a--.

Signed and Sealed this
Eighth Day of May, 2012

David J. Kappos
*Director of the United States Patent and Trademark Office*

In column 3, line 55, immediately after "an electronic component" insert --.--.

In column 4, line 8, after "user interface" delete "that".

In column 6, line 50, after "the purchasing system 120" replace "is" with --to--.

In column 9, line 6, after "engine 210 for" replace "enhance" with --enhancing--.

In column 9, line 19, before "information and details relating" replace "store" with --stores--.

In column 12, line 44, before "to the purchased notebook" replace "date" with --data--.

In column 12, line 53, before "different resources including" replace "may" with --many--.

In column 13, line 29, after "Emily of an error with" insert --the--.

In column 13, line 30, after "As shown in" delete "the".

In column 13, line 48, before "specific model of the digital" insert --the--.

In column 14, line 14, after "user interface 1500" delete "that".

In column 14, line 18, after "section 1502 that" replace "display" with --displays--.

In column 14, lines 26-27, after "of the customer support" replace "system" with --systems--.

In column 14, line 62, after "support graphical user" replace "interfaced" with --interface--.

In column 14, line 66, before "outside-help option 1602" replace "a" with --an--.

In column 15, line 11, before "for himself or for another," replace "component" with --components--.

In column 15, line 48, after "the customer support" replace "system" with --systems--.

In column 15, line 66, after "section 2006 that" replace "display" with --displays--.

In column 16, line 32, after "more customer support" replace "system" with --systems--.

In column 16, line 41, before "problems with their electronic" replace "determine" with --determining--.

In column 17, line 30, after "customer support technician" replace "user" with --using--.

CERTIFICATE OF CORRECTION (continued)
U.S. Pat. No. 8,060,418 B2

In column 17, line 34, before "for interacting with the customer" delete "that".

In column 17, line 67, after "customer does not agree," replace "than" with --then--.

In column 18, line 3, after "Once auto-detection" insert --is--.

In column 18, line 51, replace "customer indicates yes, customer" with --the customer indicates yes, the customer--.

In column 18, line 51, after "is walked through" insert --a--.

In column 19, line 11, after "customer profile with" delete "a".

In column 19, line 18, immediately after "Alternatively" insert --,--.

In column 19, line 57, after "additional product based on" delete "a".

In column 20, line 3, after "an error condition" insert --in--.

In column 20, line 38, after "line diagnostics," replace "etc. ..." with --etc.--.

In column 20, line 65, after "continues on as described" delete "as".

In column 21, line 16, replace "manufacturer of unsupported" with --the manufacturer of the unsupported--.

In column 21, line 25, after "software then prompts" insert --the--.

In column 21, line 27, before "customer would like to" insert --the--.

In column 21, lines 30-31, after "portal 104" replace "(3618). Using" with --(3618) using--.

In column 21, line 35, before "event, the digital footprint" delete "the".

<u>In the Claims</u>

In column 22, claim 8, line 41, after "the new device" replace ":" with --;--.

In column 23, claim 14, line 9, before "from the customer support" replace "obtain" with --obtained--.